US011958213B2

(12) United States Patent
Costanzo et al.

(10) Patent No.: US 11,958,213 B2
(45) Date of Patent: Apr. 16, 2024

(54) TILE SAW WITH ADJUSTABLE FENCE AND METHODS

(71) Applicant: TECHTRONIC CORDLESS GP, Anderson, SC (US)

(72) Inventors: Nicholas Costanzo, Greenville, SC (US); Michael Hart, Anderson, SC (US); Eric M. Nevel, Anderson, SC (US); Charles Moody Wacker, II, Anderson, SC (US); Ryan Burt, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 985 days.

(21) Appl. No.: 16/699,960

(22) Filed: Dec. 2, 2019

(65) Prior Publication Data

US 2020/0180185 A1 Jun. 11, 2020

Related U.S. Application Data

(60) Provisional application No. 62/802,475, filed on Feb. 7, 2019, provisional application No. 62/775,691, filed on Dec. 5, 2018.

(51) Int. Cl.

*B28D 1/04* (2006.01)
*B24B 27/06* (2006.01)
(Continued)

(52) U.S. Cl.

CPC .............. *B28D 1/047* (2013.01); *B24B 27/06* (2013.01); *B24B 27/065* (2013.01); *B27B 27/08* (2013.01); *B28D 7/02* (2013.01); *B27B 27/04* (2013.01)

(58) Field of Classification Search

CPC ........ B23D 47/042; B28D 1/047; B23Q 3/04; B23Q 1/25; B24B 41/066; B24B 41/067;
(Continued)

(56) References Cited

U.S. PATENT DOCUMENTS 4,428,159 A * 1/1984 Sigetich ................ B28D 1/047 451/236
5,090,283 A 2/1992 Noble
(Continued)

FOREIGN PATENT DOCUMENTS

CN 102335784 A 2/2012
CN 202780498 U 3/2013
(Continued)

OTHER PUBLICATIONS

Extended European Search Report for Application No. 19213837.8 dated May 5, 2020, 9 pages.

*Primary Examiner* — Joel D Crandall
*Assistant Examiner* — Makena S Markman
(74) *Attorney, Agent, or Firm* — Merchant & Gould P.C.

(57) ABSTRACT

A tile saw includes a saw with a cutting blade, a frame supporting the saw, a table supporting a workpiece and being slidable relative to the frame, and a rear fence secured to the table. The rear fence has an engagement surface and is adjustable between an operating position and a bypassed position. The bypassed position includes the engagement surface of the fence being no higher than even with the planar surface of the table to allow a workpiece to extend beyond a rear edge of the table. In the operating position, the engagement surface of the rear fence projects axially from the planar surface of the table to support the workpiece as the workpiece is pushed into the cutting blade during operation. The fence can be adjusted between the operating
(Continued)

and bypassed positions by using any one of a cam lever clamp, pin and guideway, or rotatable latch.

15 Claims, 23 Drawing Sheets

(51) Int. Cl.
*B27B 27/04* (2006.01)
*B27B 27/08* (2006.01)
*B28D 7/02* (2006.01)

(58) Field of Classification Search
CPC ....... B24B 41/06; B24B 27/06; B24B 27/065; B27B 27/10; B27B 27/02; B27B 27/08
USPC ..................... 83/471.3, 444, 467.1; 451/213; 125/13.01, 13.03, 35
See application file for complete search history.

(56) References Cited

U.S. PATENT DOCUMENTS

| | | | | |
|---|---|---|---|---|
| 6,439,218 | B1 * | 8/2002 | Hulett | B27B 27/10 125/11.22 |
| 6,637,424 | B1 | 10/2003 | Fuhrman et al. | |
| 6,752,139 | B2 | 6/2004 | Lee | |
| 6,752,140 | B1 | 6/2004 | Fuhrman et al. | |
| 7,819,044 | B2 | 10/2010 | Meredith | |
| 8,060,235 | B2 | 11/2011 | Johnson et al. | |
| 8,919,235 | B2 | 12/2014 | Sudou et al. | |
| 9,403,284 | B2 | 8/2016 | Liu et al. | |
| 9,895,823 | B2 | 2/2018 | Lin et al. | |
| 9,993,938 | B2 | 6/2018 | Chen | |
| 2006/0011033 | A1 | 1/2006 | Rossetti et al. | |
| 2006/0266182 | A1 | 11/2006 | Balolia | |
| 2011/0197733 | A1 * | 8/2011 | Liu | B27B 27/02 83/444 |
| 2012/0006167 | A1 | 1/2012 | Liu | |
| 2016/0046034 | A1 | 2/2016 | Burke et al. | |
| 2017/0057112 | A1 * | 3/2017 | Chen | B23D 45/06 |
| 2017/0157797 | A1 * | 6/2017 | Wung | B28D 1/042 |

FOREIGN PATENT DOCUMENTS

| | | | |
|---|---|---|---|
| CN | 205043250 | U | 2/2016 |
| EP | 3181316 | A1 | 6/2017 |
| WO | 2018001094 | A1 | 1/2018 |

* cited by examiner

TILE SAW WITH ADJUSTABLE FENCE AND METHODS

This application claims priority under 35 U.S.C. § 119(e) to provisional patent application 62/775,691 filed Dec. 5, 2018 and provisional patent application 62/802,475 filed Feb. 7, 2019. Each of these applications is incorporated herein by reference.

TECHNICAL FIELD

This disclosure concerns a tile saw. More particularly, this disclosure relates to a tile saw having an adjustable fence and methods of use.

BACKGROUND

Tile saws are used for cutting workpieces, such as ceramic tile. Typically, tile saws are sized to accommodate up to 8 in×8 in or 12 in×12 in tiles. However, larger tile sheets are now being offered and are popular in the market place.

SUMMARY

In one aspect, a tile saw is provided. The tile saw includes a saw having a cutting blade; a frame supporting the saw; a table having a planar surface configured to support a workpiece, the table being slidable relative to the frame; and a rear fence secured to the table. The rear fence has an engagement surface and is adjustable between an operating position and a bypassed position. The operating position includes the engagement surface of the fence fixed to project upwardly from the planar surface of the table to support the workpiece during a cutting operation. The bypassed position includes the engagement surface of the fence no higher than even with the planar surface of the table to allow a workpiece to extend beyond a rear edge of the table.

In some examples, the engagement surface, when in the operating position, is disposed along a plane that is perpendicular to a plane containing the cutting plane.

In some embodiments, the rear fence is pivotable between the operating position and the bypassed position.

In some aspects, the engagement surface of the rear fence, when in the bypassed position, is in a same plane as the planar surface of the table.

In one or more arrangements, the engagement surface of the rear fence, when in the bypassed position, is in a plane parallel to the planar surface of the table.

In some embodiments, a latch arrangement selectively holds the rear fence in the operating position and releases the rear fence to the bypassed position.

In some implementations, the latch arrangement includes a rotatable latch secured to the rear fence and a keeper integral with a rear face of the table.

In some embodiments, the rear fence is slidable between the operating position and the bypassed position.

In one or more embodiment, the engagement surface of the rear fence, when in both the operating position and bypass position, is perpendicular to the planar surface of the table.

In one or more embodiments, a pin and guideway arrangement selectively holds the rear fence in the operating position and releases the rear fence to the bypassed position.

In some aspects, the pin and guideway arrangement includes a guideway defined within the fence a knobbed pin adjustable within the guideway to selectively fix the rear fence in one of the operating position and the bypassed position.

In some implementations, the guideway includes a first elongated slot defined by the fence; the first slot having a longitudinal axis perpendicular to a plane containing the table; and the pin includes a first threaded bolt secured to the table and having a first knob threadably connected to the first bolt.

In one or more embodiments, a second elongated slot is defined by the fence; the second slot having a longitudinal axis perpendicular to the plane containing the table; and the pin includes a second threaded bolt secured to the table and having a second knob releasably and threadably connected to the second bolt.

Some embodiments further include a spring and detent arrangement for holding the fence in the selected operating position or the bypassed position; the spring and detent arrangement can include at least one spring secured to one of the fence and a rear face of the table; and at least one detent positioned to engage the spring defined by the other of the fence and rear face of the table.

The spring and detent arrangement may include at least two springs and two detents.

In some implementations, each spring comprises a leaf spring secured to the rear face of the table; and each detent is defined by the fence.

A clamp arrangement can be used in some embodiments to selectively hold the rear fence in one of the operating position and the bypassed position.

In example embodiments, the clamp arrangement may include a cam lever clamp having a pivot lever secured to a spring-biased bolt, the bolt extending through the rear fence and into a rear face of the table.

In some embodiments, the tile saw further includes a rip guide secured to the table having a rip guide engagement surface in a plane parallel to a plane containing the cutting blade.

In many embodiments, the tile saw further includes a water tray on a side of the saw opposite of the table.

In many implementations, the table is fixed relative to the frame when the rear fence is in the bypassed position.

In another aspect, a method of adjusting a tile saw to accommodate a long length of tile is provided. The method includes providing a saw having a cutting blade, a frame supporting the saw, a table having a planar surface configured to support the tile, and the table being slidable relative to the frame. A rear fence is secured to the table. The method further includes the step of adjusting the rear fence from an operating position to a bypassed position, by moving an engagement surface of the fence to a position substantially even with the planar surface of the table to allow the tile to extend beyond a rear edge of the table.

In some methods, the step of adjusting includes pivoting the rear fence between the operating position and the bypassed position.

In some implementations, the step of adjusting includes using a latch to release the rear fence from the operating position and then pivoting the rear fence to the bypassed position.

In some aspects, the step of adjusting including sliding the rear fence between the operating position and the bypassed position.

In some implementations, the step of adjusting includes loosening a knob to release the rear fence from the operating position, and then sliding the rear fence to the bypassed position.

The step of loosening a knob can include, in some methods, loosening first and second knobs to release the rear fence from the operating position and then sliding the rear fence to the bypassed position.

In some methods, the step of sliding the rear fence between the operating position and the bypassed position includes moving the fence against a spring between a pair of detents.

In some methods, the step of sliding the rear fence between the operating position and the bypassed position includes moving the fence against a pair of springs, each spring moving between a respective pair of detents.

During example methods, the step of adjusting includes pivoting a cam lever to loosen a clamping force between the rear fence and the table and then sliding the rear fence to the bypassed position.

Other aspects of this disclosure will become apparent by consideration of the detailed description and accompanying drawings.

DETAILED DESCRIPTION

Figure 1:
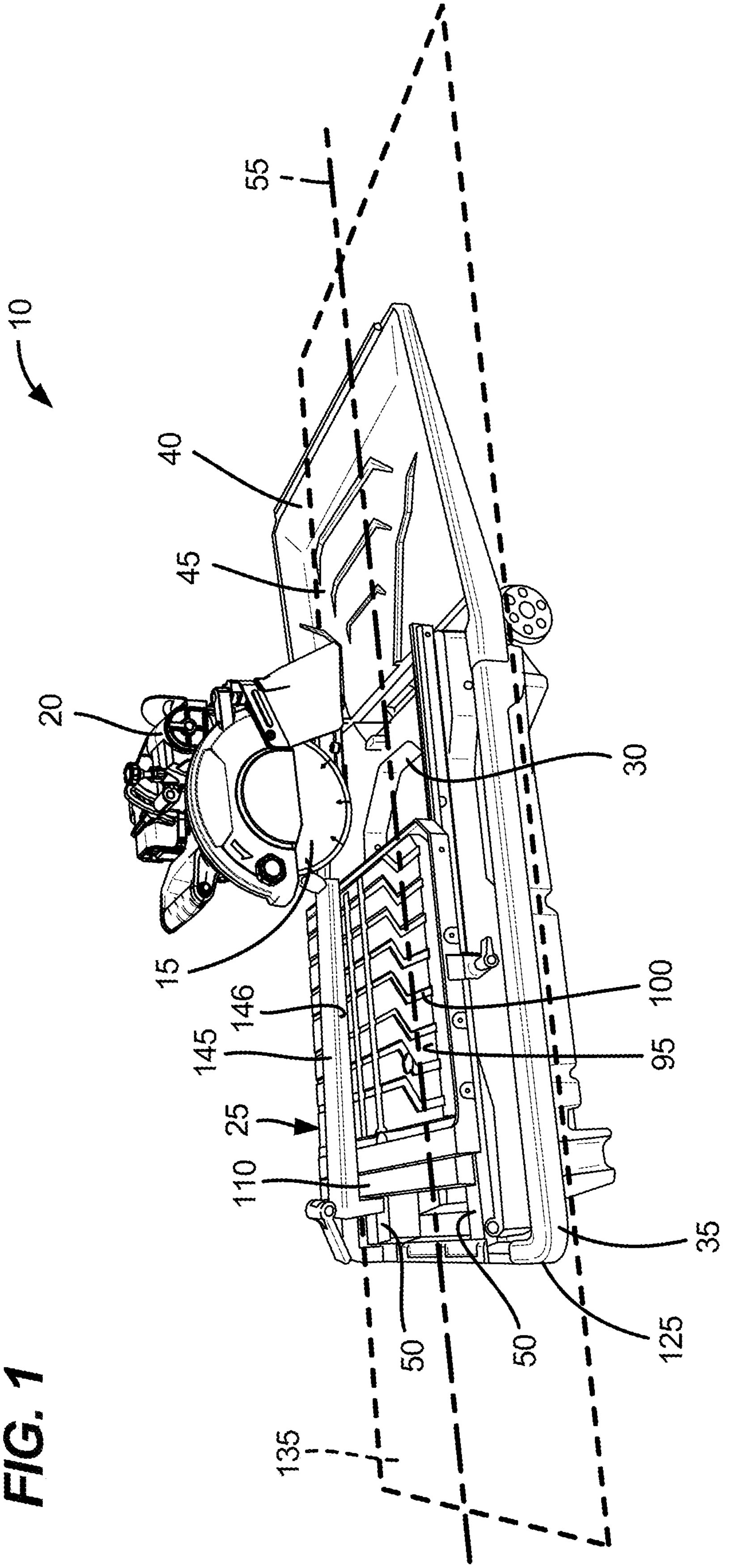
FIG. 1 is a schematic, perspective view of a tile saw, constructed in accordance with principles of this disclosure.

This disclosure provides a wet tile saw 10 that can be used to accurately and quickly cut construction materials, such as ceramic, marble, or granite tiles, and the like. The wet tile saw 10 employs a lubricant, such as water, to cool a cutting blade 15 and to carry away debris removed during the cutting process. As illustrated in FIG. 1, the wet tile saw 10 includes a saw 20, a table 25, a frame 30, a pan 35, and an extension 40.

The frame 30 is a structural component that includes one or more rails 50 (e.g., a pair of rails) that extend along a longitudinal axis 55 of the tile saw 10, the one or more rails 50 defining a guide. In some embodiments, at least two rails 50 are spaced apart from one another such that they are on opposite sides of the frame 30.

The table 25 may include a substantially planar top surface 95 that is arranged to support a workpiece 135, such as a piece of tile (shown schematically in FIG. 1) to be cut. The workpiece 135 may extend beyond the edges of the table 25 in some embodiments, and include a greatest dimension (e.g., a maximum length, a maximum width, and/or the like) that is at least about 12" more, at least about 24" more, at least about 36" more, and/or the like. The workpiece 135 may include a square shape, a rectangular shape, and/or the like.

The top surface 95 includes a plurality of grooves or slots 100 arranged to direct the liquid coolant and collected cutting debris off the table 25 and into the pan 35. In addition, the table 25 includes multiple slots 105 (e.g., two slots 105, three slots 105, and/or the like) that extend parallel to the saw axis 55 and that are shaped to receive the cutting blade 15 during a cut. A first slot **105*a* is arranged to receive the blade 15 during a vertical cut and is therefore substantially vertical. A second slot 105*b* is angled at a first angle, such as 45° from vertical, to receive the saw blade 15 during a bevel cut at the first angle. A third slot 105*c* is arranged at a second angle, such as 60° from vertical, to receive the saw blade 15 during a bevel cut at the second angle. Additional slots 105** may be provided at different angles, if desired.

The extension 40 is configured to attach to the pan 35, the frame 30, and/or a stand (not shown) and extends beyond the pan 35 behind the saw 20. The extension 40 functions as a water tray 45 and is angled to catch lubricant that splashes in the rearward direction and direct the lubricant back to the pan 35. The water tray 45 is on a side of the saw 20 opposite of the cutting blade 15.

The table 25 may include a rear fence 110. The rear fence 110 is configured to provide support for the workpiece 135 as the workpiece 135 is pushed, or otherwise moved, into the blade 15 during a cutting operation. As is described further below, the rear fence 110 has an engagement surface 115 (FIGS. 3, 6-10, 17, 19, 22, and 23) that is adjustable (e.g., via rotating, pivoting, sliding, and/or the like) between an operating position and a bypassed position (the bypassed position being shown in FIG. 1). The fence 110 is described in detail further below.

The operating position includes the engagement surface 115 of the rear fence 110 fixed to project upward from the planar top surface 95 of the table 25 to support workpiece 135, such as tile, as the workpiece 135 is pushed into the cutting blade 15 during operation. Alternatively, other arrangements can include saws in which the workpiece 135 is stationary, while the blade moves or translates over the workpiece 135. FIGS. 2, 4, 7, 12, 14, 17, and 20 show the engagement surface 115 of the rear fence 110 in the operating position. In the operating position, the table 25 will move along the rails 25 along the axis 55 (FIG. 1) in a direction toward the cutting blade 15, with the engagement surface 115 engaged against (e.g., abutting) the workpiece.

The bypassed position includes the engagement surface 115 of the rear fence 110 no higher than even with the planar top surface 95 of the table 25. That is, in some embodiments the engagement surface 115 of the rear fence 110 may be substantially even with and, thus, substantially planar with the planar top surface 95 of the table 25. In some embodiments, the engagement surface 115 of the rear fence 110 may be lower than and non-planar with the planar top surface 95 of the table 25. This layout allows the workpiece 135 to extend beyond a rear edge 125 (FIG. 1) of the table 25. In this way, larger workpieces 135 may be accommodated for cutting by the saw 20. In FIG. 1, the workpiece 135, shown schematically, extends beyond the rear edge 125 of the table 25. This position of the workpiece 135 is possible because the engagement surface 115 does not extend higher than the planar top surface 95 of the table 25. The bypassed position is shown in FIGS. 1, 3, 5, 6, 8, 9, 13, 15, 18, and 21.

When the engagement surface 115 of the rear fence 110 is in the bypass position, a rip guide 145 (FIG. 1) having an engagement surface 146 parallel to the plane of the cutting blade 115 and the axis 55 is used to abut against an edge of the workpiece 135. The position of the rip guide 145 is adjustable, and can be selectively moved or translated or slid by the user into an abutting engagement against an edge of the workpiece 135, When the engagement surface 115 of the rear fence 110 is in the bypassed position, the table 25 may be fixed relative to the frame 30. The workpiece 135 may be moved into the cutting blade 15 by the user pushing the workpiece 135 across the top surface 95 of the table 25 and into the cutting blade 15.

1. The Embodiment of FIGS. 2-11

Figure 2:
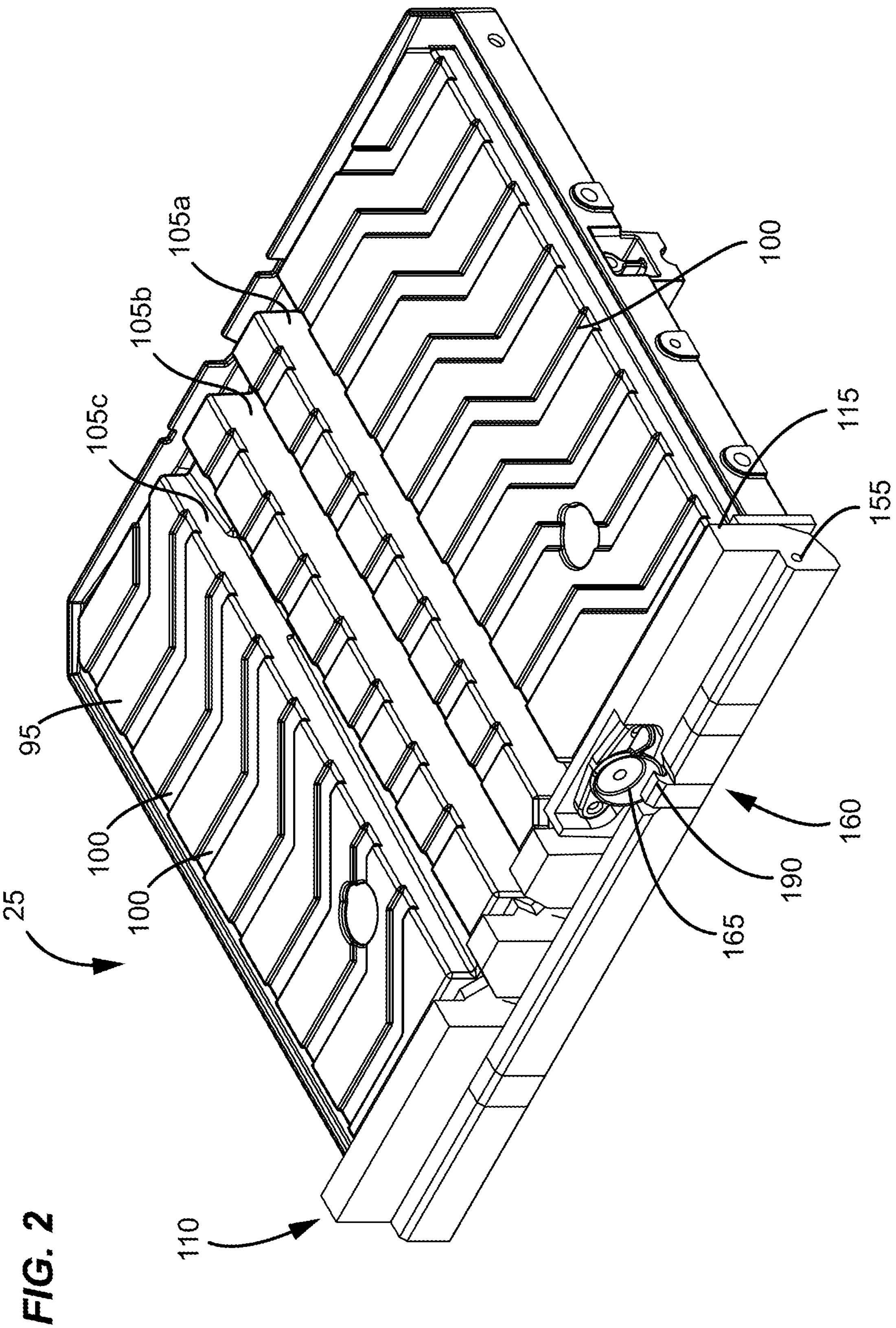
FIG. 2 is a perspective view of a first embodiment of a table and adjustable fence, the fence being in the operating position.
Figure 3:
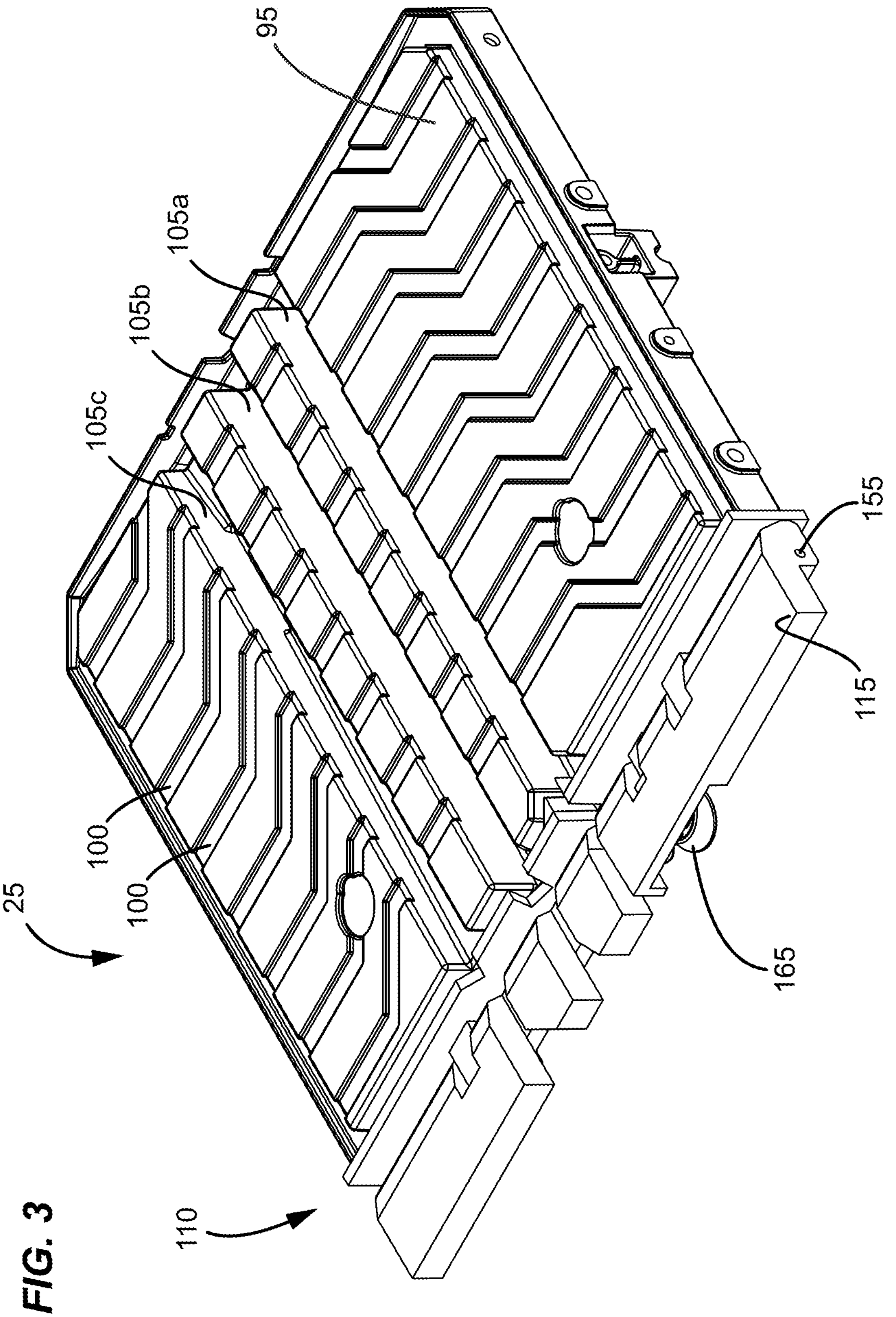
FIG. 3 is a perspective view of the table and fence of FIG. 2, the fence being in the bypassed position.
Figure 4:
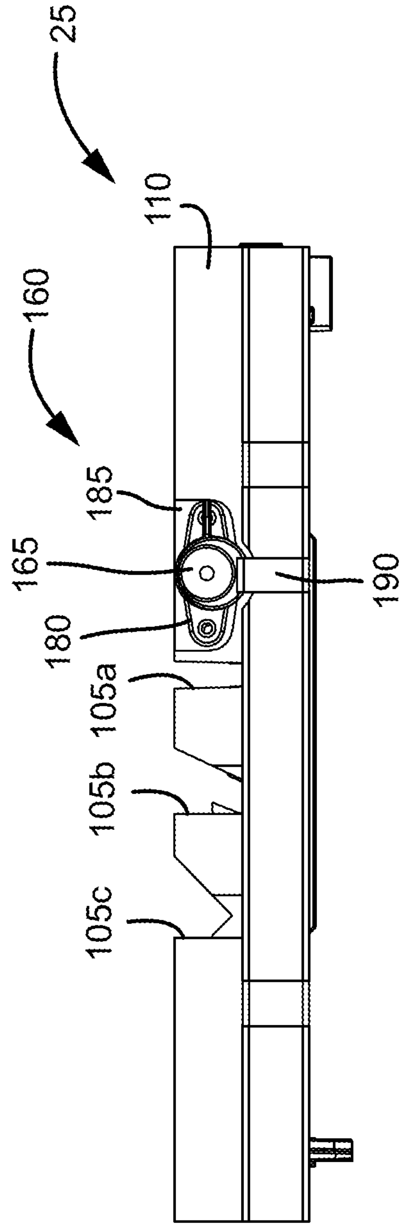
FIG. 4 is a front view of the table and fence of FIG. 2.
Figure 5:
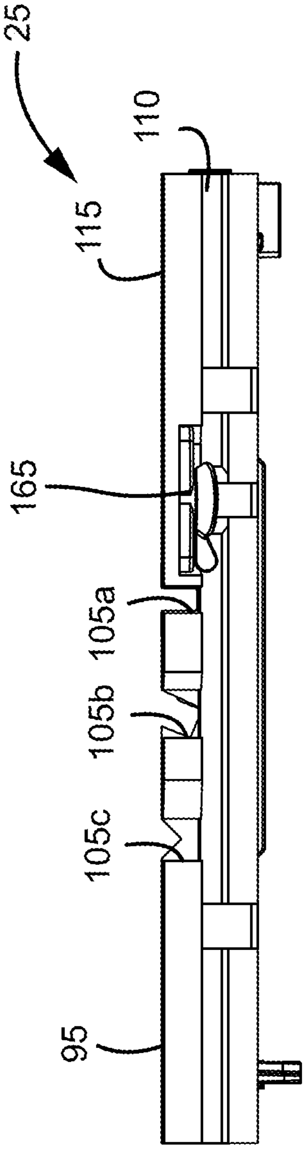
FIG. 5 is a front view of the table and fence of FIG. 3.
Figure 6:
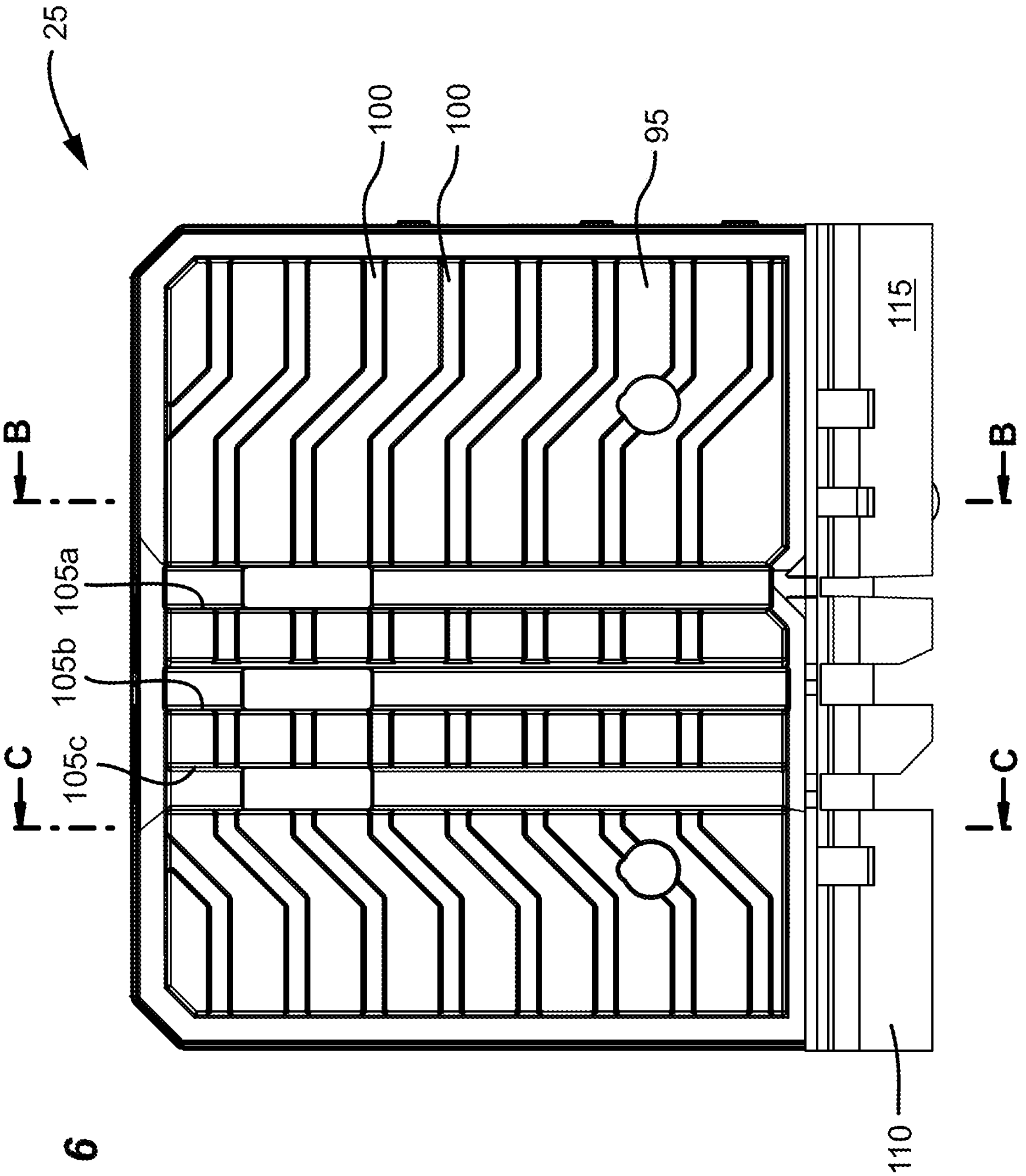
FIG. 6 is a top plan view of the table and fence in the bypass position of FIG. 3.
Figure 7:
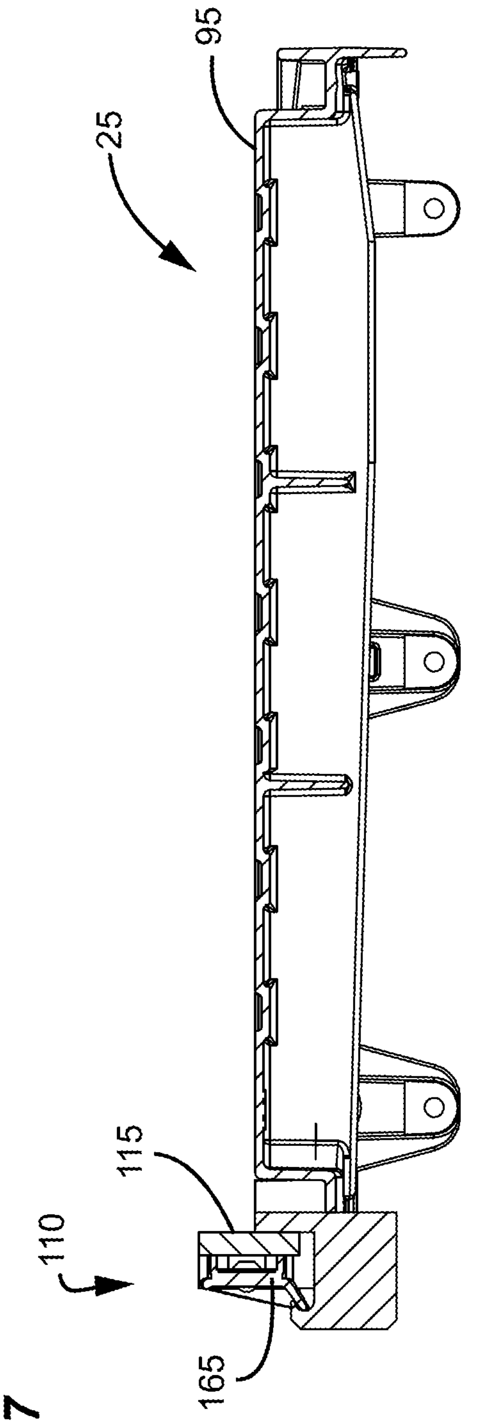
FIG. 7 is a cross-sectional view of the table and fence of FIG. 6, taken along the line B-B, but showing the fence in the operating position.
Figure 8:
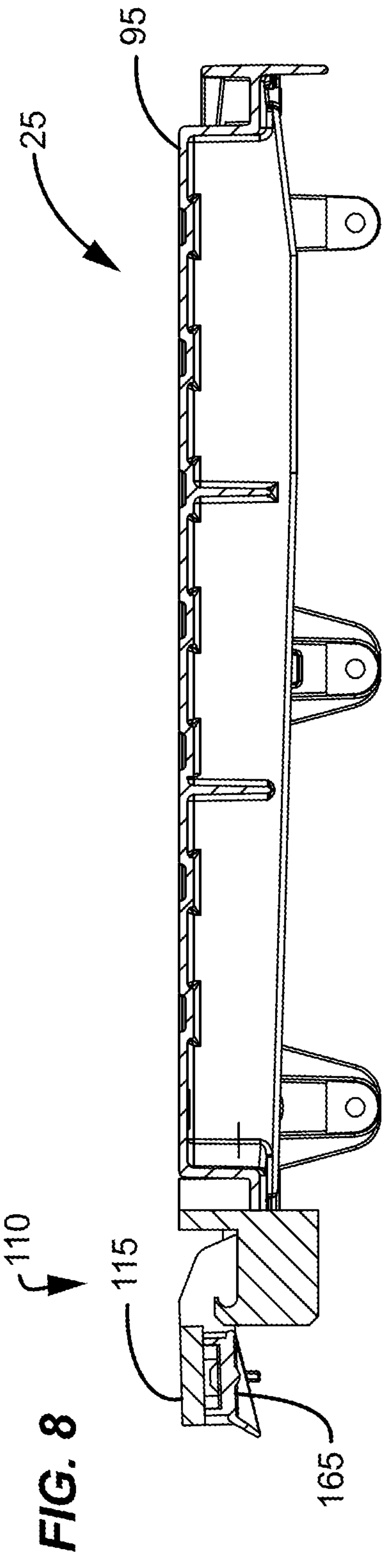
FIG. 8 is a cross-sectional view of the table and fence, taken along the cross section of B-B of FIG. 6, and showing the fence in the bypass position.

Attention is now directed to the first embodiment of the rear fence 110 shown in FIGS. 2-11. In this embodiment, the rear fence 110 is pivotable between the operating position and the bypassed position. FIG. 2 shows the rear fence 110 in the operating position. The engagement surface 115 is contained within a plane perpendicular to a plane containing the cutting blade 15.

Figure 9:
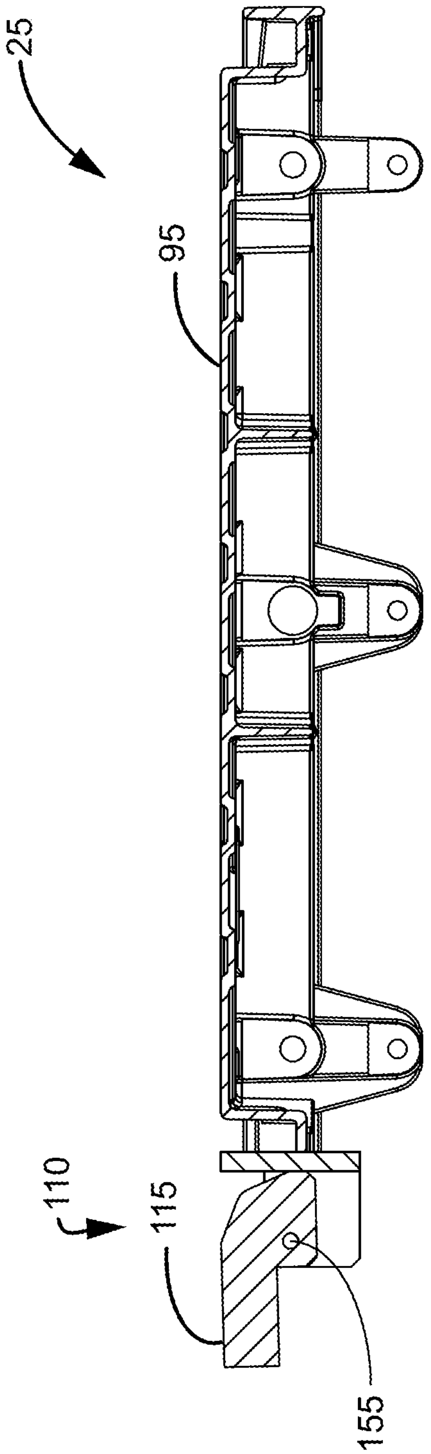
FIG. 9 is a cross-sectional view of the table and fence taken along the line C-C of FIG. 6.

The rear fence 110 is pivotable about a hinge point 155. When the rear fence 110 is pivoted from the operating position to the bypassed position, the engagement surface 115 is in a same plane, or a plane no higher than the planar surface 95 of the table 25. FIG. 9 shows a cross-sectional view of the table 25 with the rear fence 110 in the bypassed position. In the example embodiment, the engagement surface 115 is in the same plane as the planar surface 95 of the table 25. In other embodiments, the engagement surface 115 can be in a plane parallel to, or substantially parallel (i.e., within about +/−10° of being parallel) to the planar surface 95 of the table, and be lower than the top surface 95.

Figure 10:
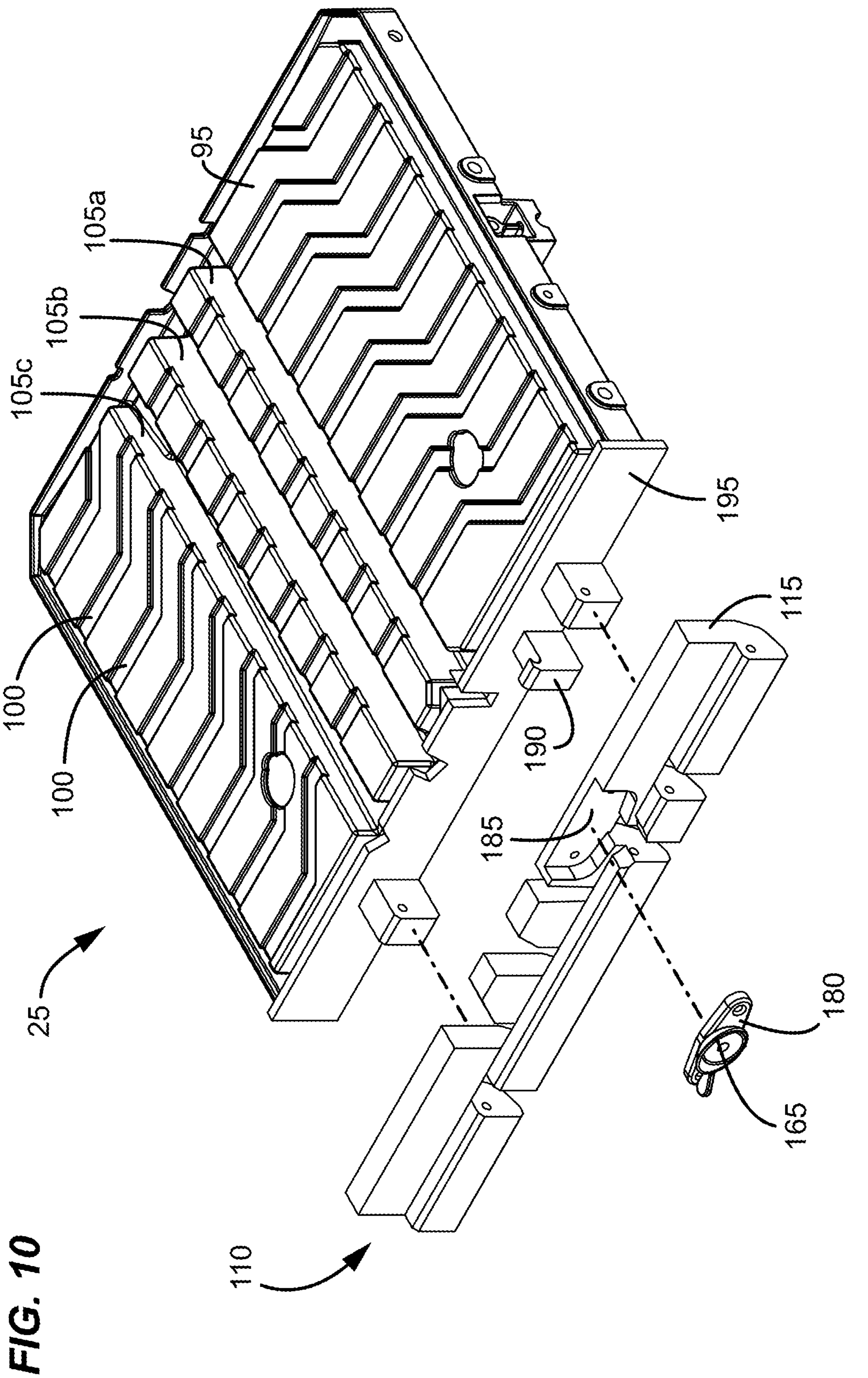
FIG. 10 is an exploded, perspective view of the table and fence of FIG. 2.
Figure 11:
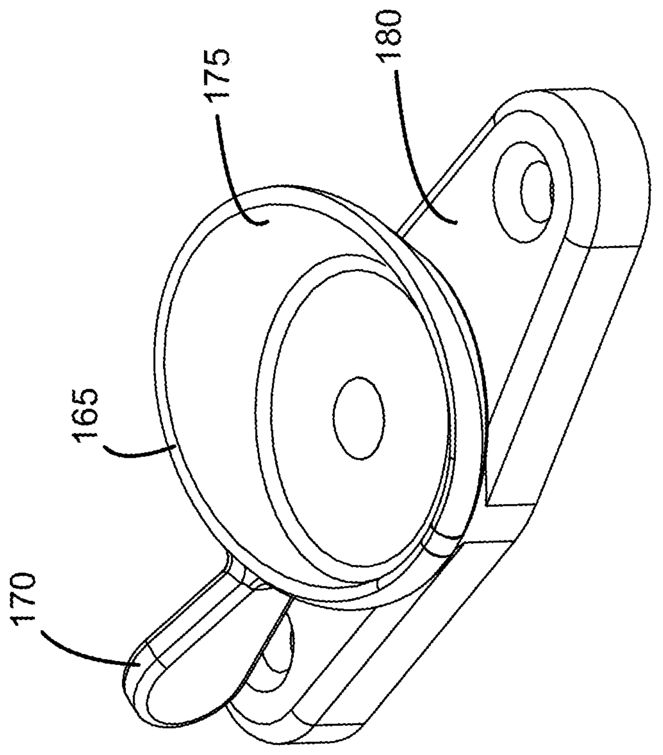
FIG. 11 is a perspective view of the rotatable latch used with the table and fence of FIG. 2.
Figure 12:
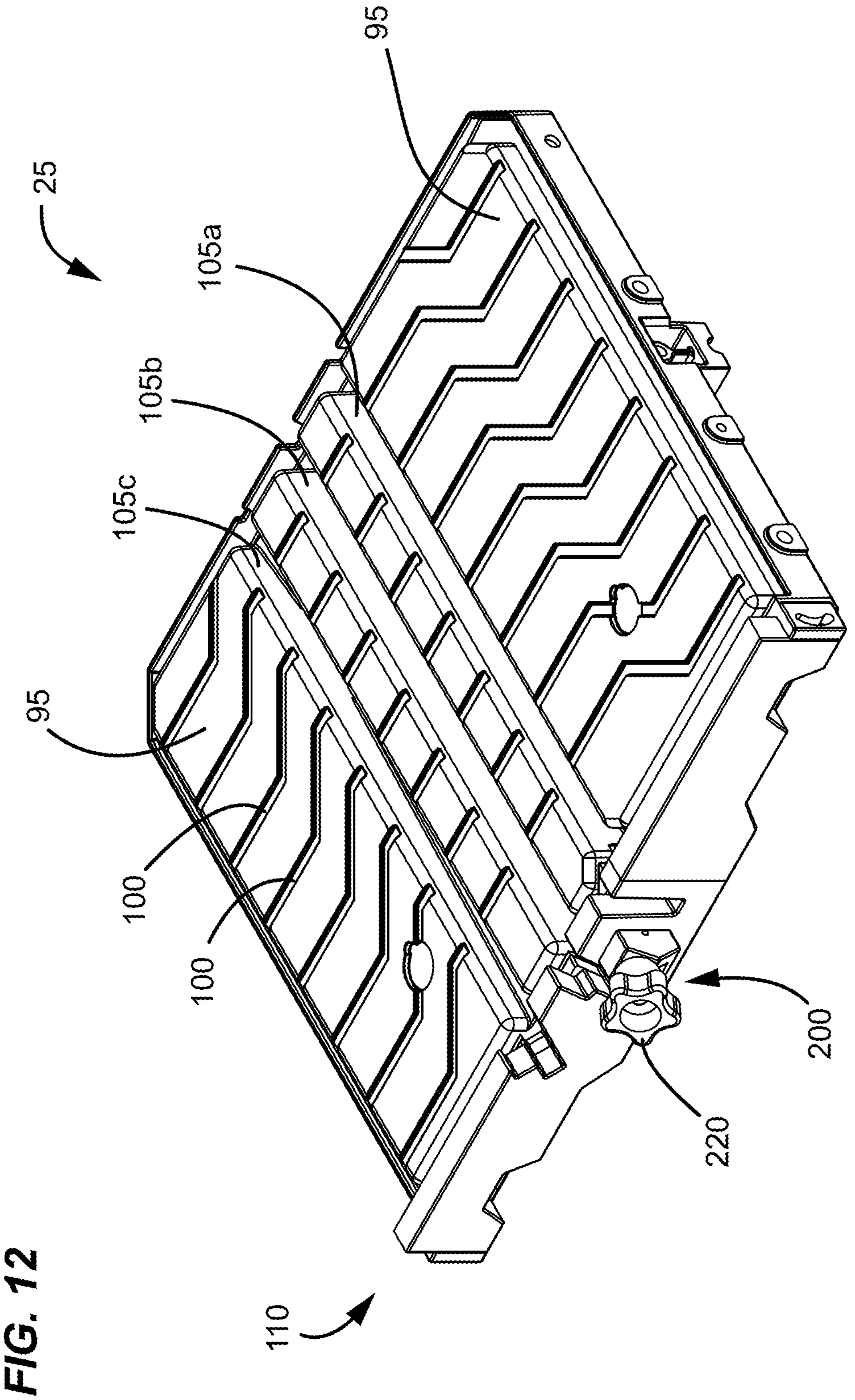
FIG. 12 is a perspective view of a second embodiment of a table and fence, the fence being depicted in the operating position.

Still in reference to FIGS. 2-11, the tile saw 10 includes a latch arrangement 160 to selectively hold the rear fence 110 in the operating position and release the rear fence 110 to the bypassed position. Many embodiments are possible. In the one shown, the latch arrangement 110 includes a rotatable latch 165. The rotatable latch 165 includes a handle 170 (FIG. 11). The handle 170 can be used to rotate the wall 175, which varies in height. The rotatable latch 165 is secured using mount 180 to the rear fence 110 at latch location 185 (FIG. 10). A keeper 190 is integral with a rear portion or face 195 (FIG. 10) of the table 25. In use, the latch 165 is in the locked or latched position (FIG. 2) with the keeper 190 extending over the wall 175 of the latch 165. When it is desired to move the rear fence 110 into the bypass position, the handle 170 may be rotated within a plane generally parallel to the engagement surface 115. This moves the locking portion of the wall 175 from engagement with the keeper 190. This then releases the rear fence 110 and allows the rear fence 110 to pivot about the hinge point 155 for positioning the engagement surface 115 into the bypass position.

2. The Embodiment of FIGS. 12-19

Figure 13:
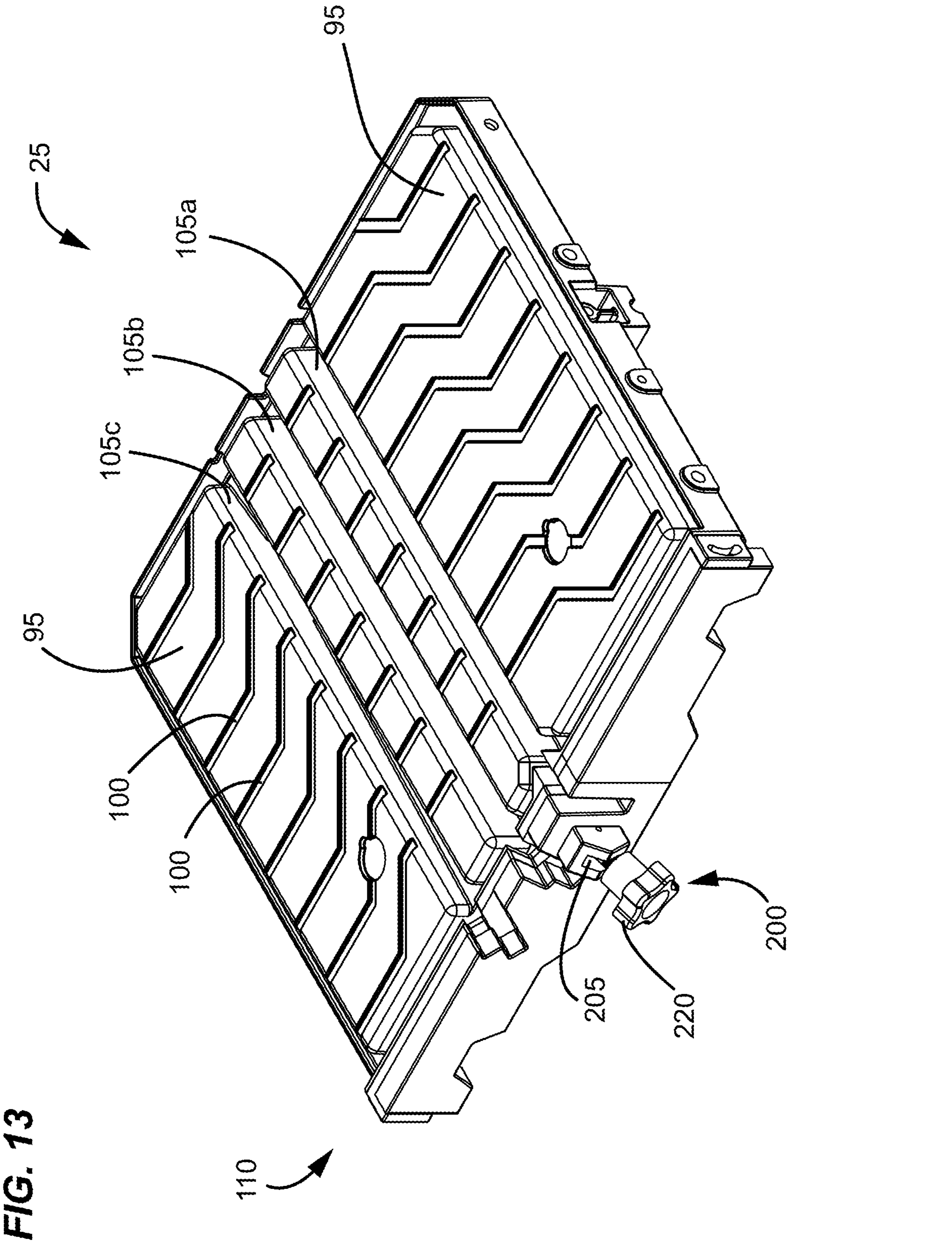
FIG. 13 is a perspective view of the table and fence of FIG. 12, but the fence being shown in a bypass position.
Figure 14:
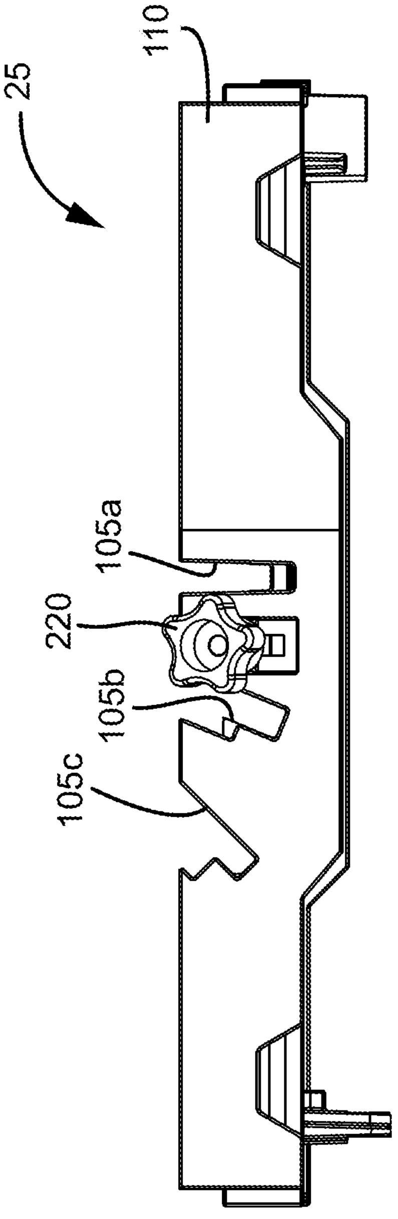
FIG. 14 is a front view of the table and fence of FIG. 12.
Figure 15:
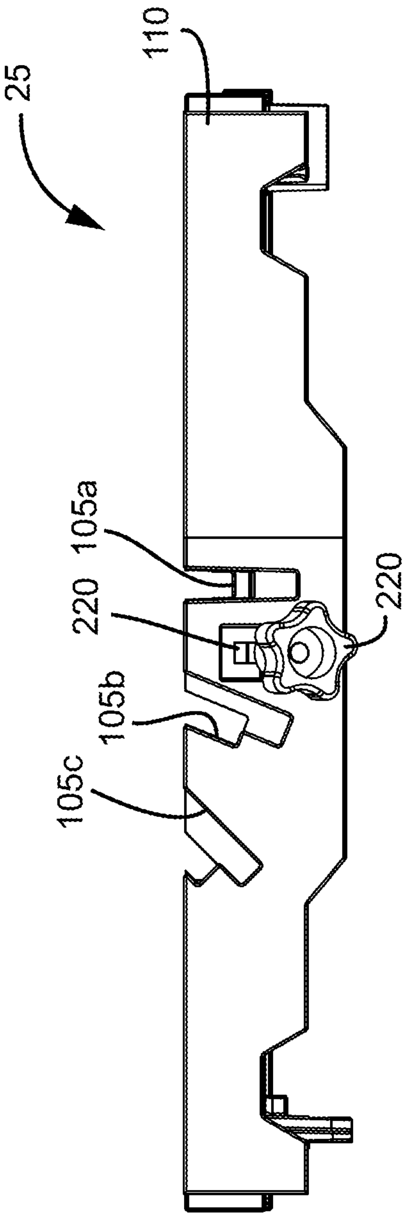
FIG. 15 is a front view of the table and fence of FIG. 13.
Figure 16:
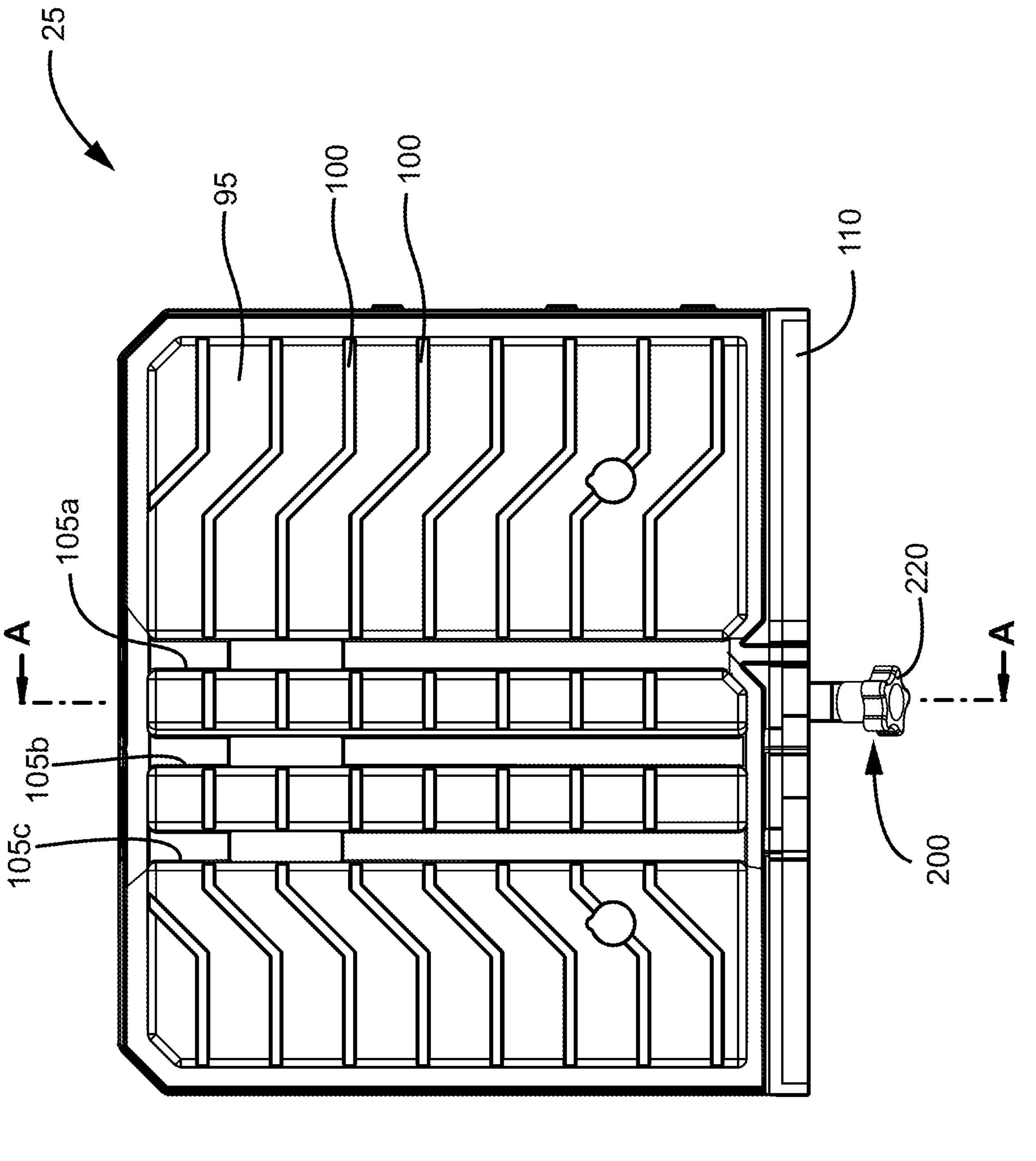
FIG. 16 is a top plan view of the table and fence of FIG. 12.
Figure 17:
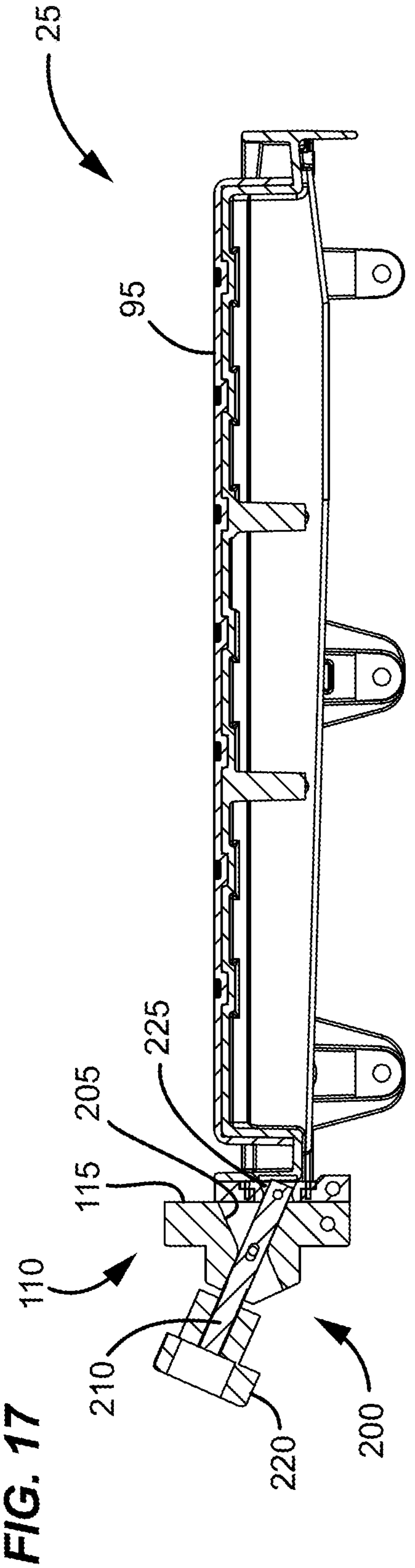
FIG. 17 is a cross-sectional view of the table and fence of FIG. 16, the cross-section being taken along the line A-A of FIG. 16.
Figure 18:
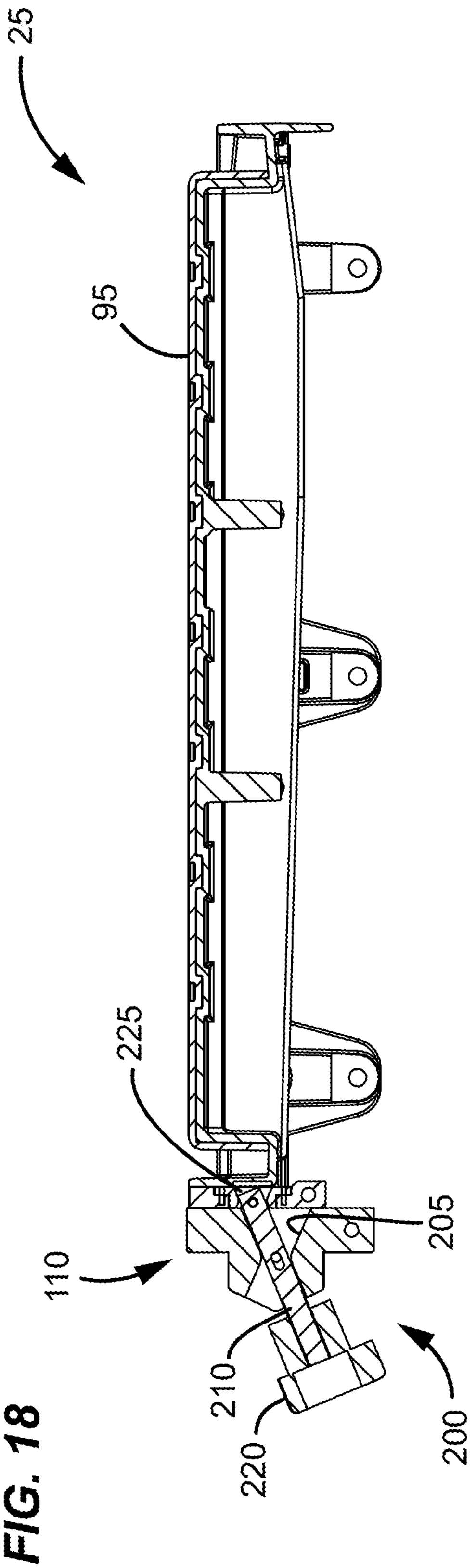
FIG. 18 is a cross-sectional view of the table and fence of FIG. 16, but showing the fence in a bypass position.
Figure 19:
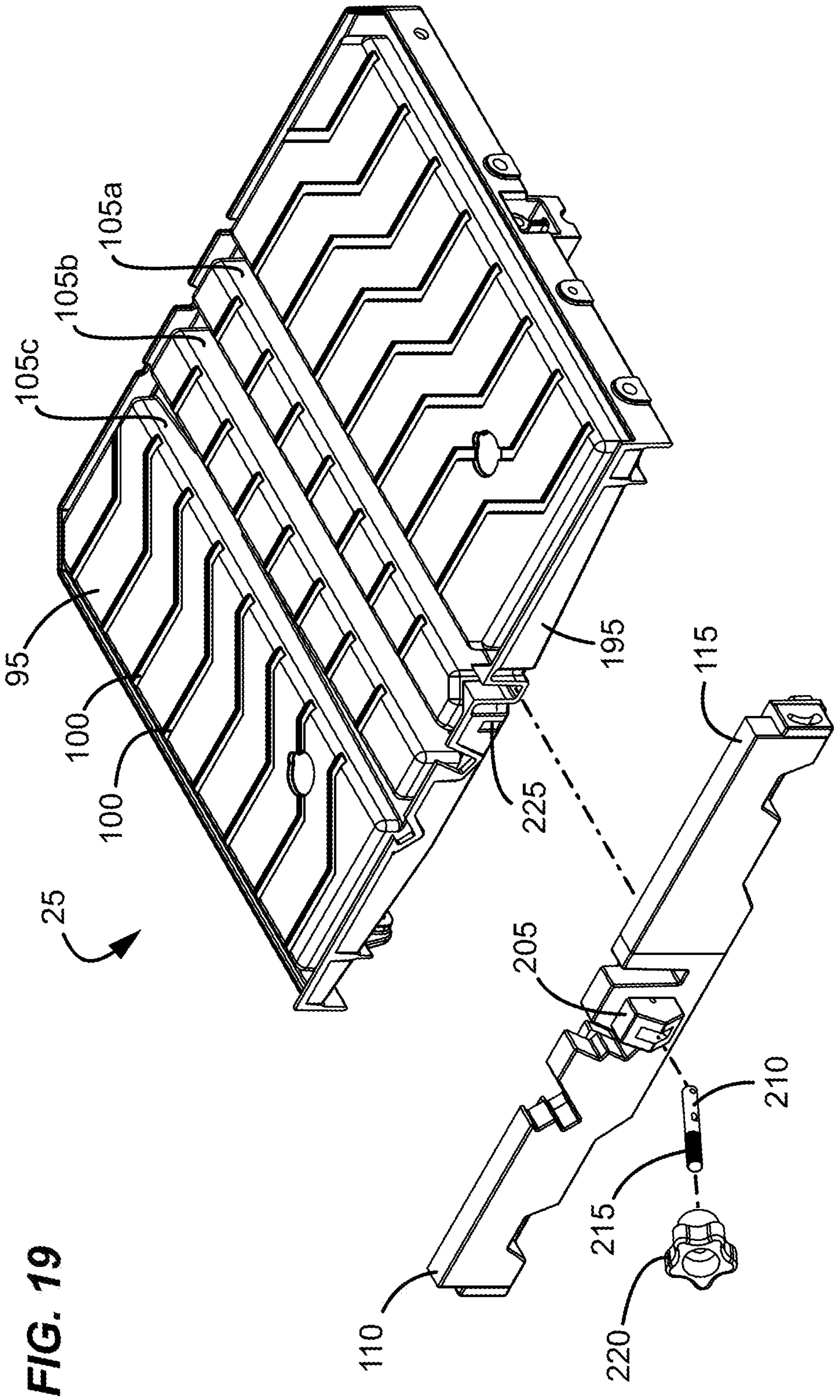
FIG. 19 is an exploded, perspective view of the table and fence of FIG. 12.

Reference is now made to the embodiment of FIGS. 12-19. In this embodiment, the rear fence 110 is slidable and, thus, linearly translatable between the operating position (FIGS. 12, 14, and 17) and the bypassed position (FIGS. 13, 15, and 18.)

The engagement surface 115 of the rear fence 110 remains perpendicular, or substantially perpendicular (i.e., within about +/−15° of being perpendicular), to the planar top surface 95 of the table 25, when in both the operating position and the bypassed position. The engagement surface 115 is also within a plane that is perpendicular, or substantially perpendicular, to the plane containing the cutting blade 15. The engagement surface 115 is adjustable between the operating position and the bypass position by a pin and guideway arrangement 200. The pin and guideway arrangement 200 selectively holds the rear fence 110 in the operating position and releases the rear fence 110 to the bypassed position.

Many embodiments are possible. In the embodiment shown, the pin and guideway arrangement 200 includes a guideway 205 (FIGS. 17-19) defined within the fence 110. A knobbed pin 210 is adjustable within the guideway 205 to selectively fix the rear fence 110 in one of the operating position and bypassed position.

The knobbed pin 210 includes a threaded section 215 (FIG. 19) and a turn knob 220. The guideway 205 is shaped so that the pin 210 can be moved therewithin, and the end of the pin 210 can be positioned within an aperture 225 along the rear face 195 of the table 25.

In use, when the user desires to move the rear fence 110 from the operating position to the bypass position, the user may rotate the knob 220 in a direction away from the rear fence 110. This allows the pin 210 to be moved within the guideway 205 from the operating position of FIG. 17 to the bypass position of FIG. 18. The knob 220 can then be rotated in a direction toward the rear fence 110 to tighten the knob

220 against the fence 110 and secure the pin 210 in its position in the guideway 205 and within the aperture 225.

3. The Embodiment of FIGS. 20-23

Figure 21:
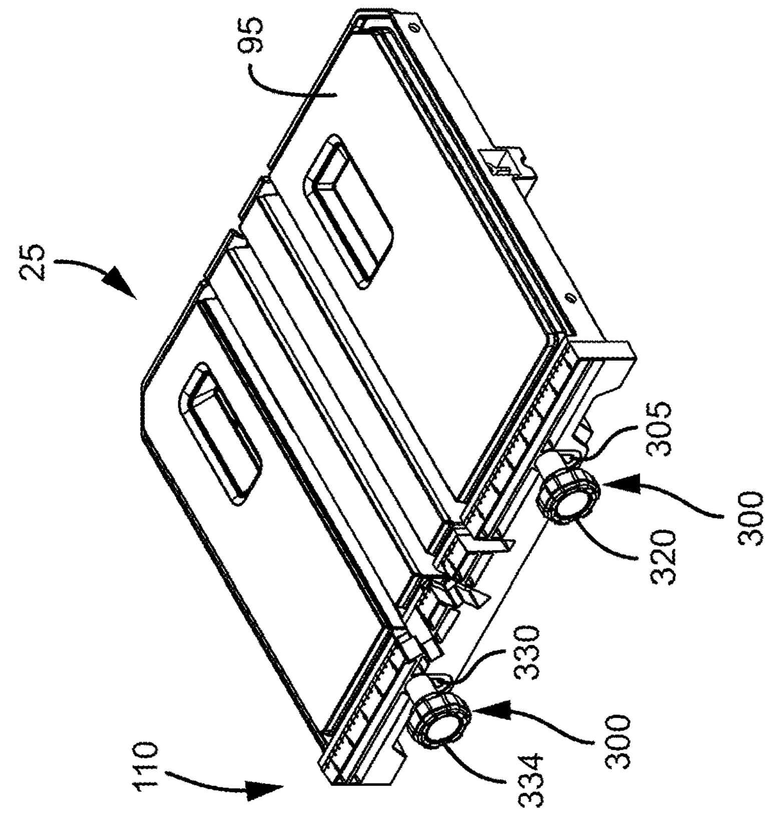
FIG. 21 is a perspective view of the table and fence of FIG. 20, but the fence being shown in a bypass position.
Figure 20:
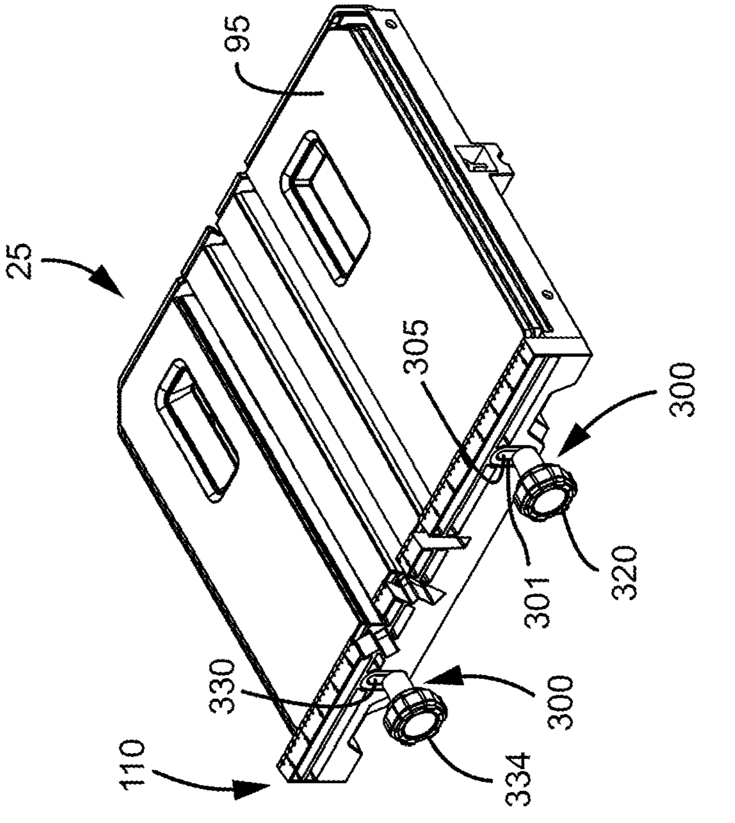
FIG. 20 is a perspective view of a third embodiment of a table and fence, the fence being depicted in the operating position.
Figure 22:
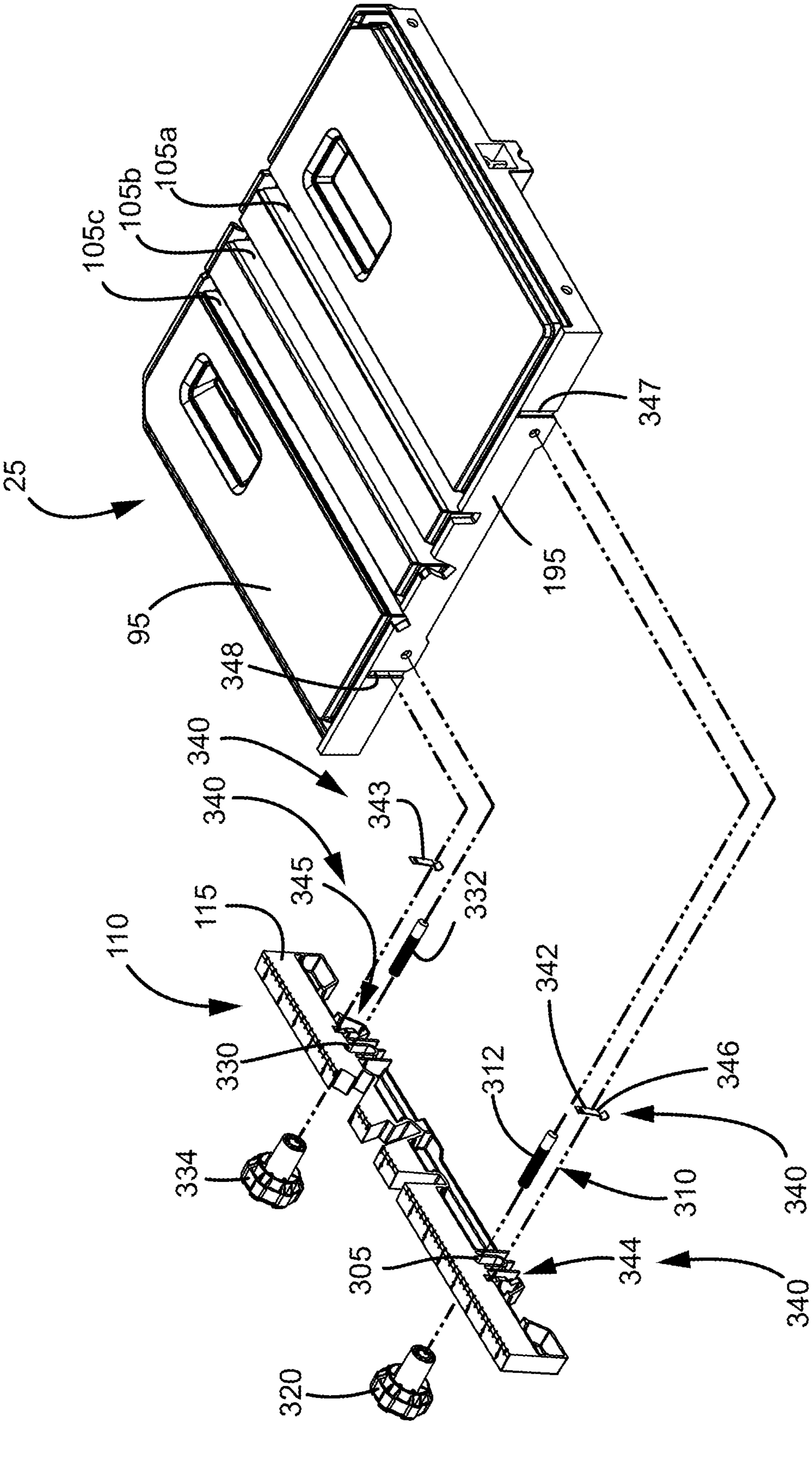
FIG. 22 is an exploded perspective view of the table and fence of FIGS. 20 and 21.

Reference is now made to the embodiment of FIGS. 20-23. In this embodiment, the rear fence 110 is slidable between the operating position (FIG. 20) and the bypassed position (FIG. 21).

The engagement surface 115 of the rear fence 110 remains perpendicular to the planar top surface 95 of the table 25, when in both the operating position and the bypassed position. The engagement surface 115 is also within a plane that is perpendicular to the plane containing the cutting blade 15. The engagement surface 115 is adjustable between the operating position and the bypass position by a pin and guideway arrangement 300. The pin and guideway arrangement 300 selectively holds the rear fence 110 in the operating position and releases the rear fence 110 to the bypassed position.

Many embodiments are possible. In the embodiment shown, the pin and guideway arrangement 300 includes a guideway 301 embodied as at least a first elongated through slot 305 defined by the fence 110. The slot 305 has a longitudinal axis 306 (FIG. 23) perpendicular to a plane containing the planar top surface 95 of the table 25. A pin 310 includes a first threaded bolt 312 secured to the table 25 and has a first turn knob 320 threadably connected to the first bolt 312. The slot 305 is movable about the pin 310 to selectively fix the rear fence 110 in one of the operating position and bypassed position.

While only a single pin and guideway arrangement 300 can be used, in the embodiment shown, there may additionally be a second elongated through slot 330 and a second threaded bolt 332 with a second turn knob 334, functioning the same as the first slot 305, first bolt 312, and first turn knob 320.

In accordance with principles of this disclosure, the tile saw 10 may additionally include a spring and detent arrangement 340 for holding the fence 110 in the selected operating position or bypassed position. The spring and detent arrangement 340 includes at least one spring 342 secured to either one of the fence 110 and a rear face 195 of the table 25, and at least one detent arrangement 344 positioned to engage the spring 342 defined by the other of the fence 110 and rear face 195 of the table 25.

In the embodiment shown, the at least one spring 342 comprises a leaf spring 346 secured to the rear face 195 of the table 25 and positioned to engage the detent arrangement 344 defined by the fence 110 along the same surface as the engagement surface 115. While only a single spring and detent arrangement 340 can be used, there may be two springs 342, 343, each being a leaf spring secured to the rear face 195 of the table 25, and two detent arrangements 344, 345.

Figure 23:
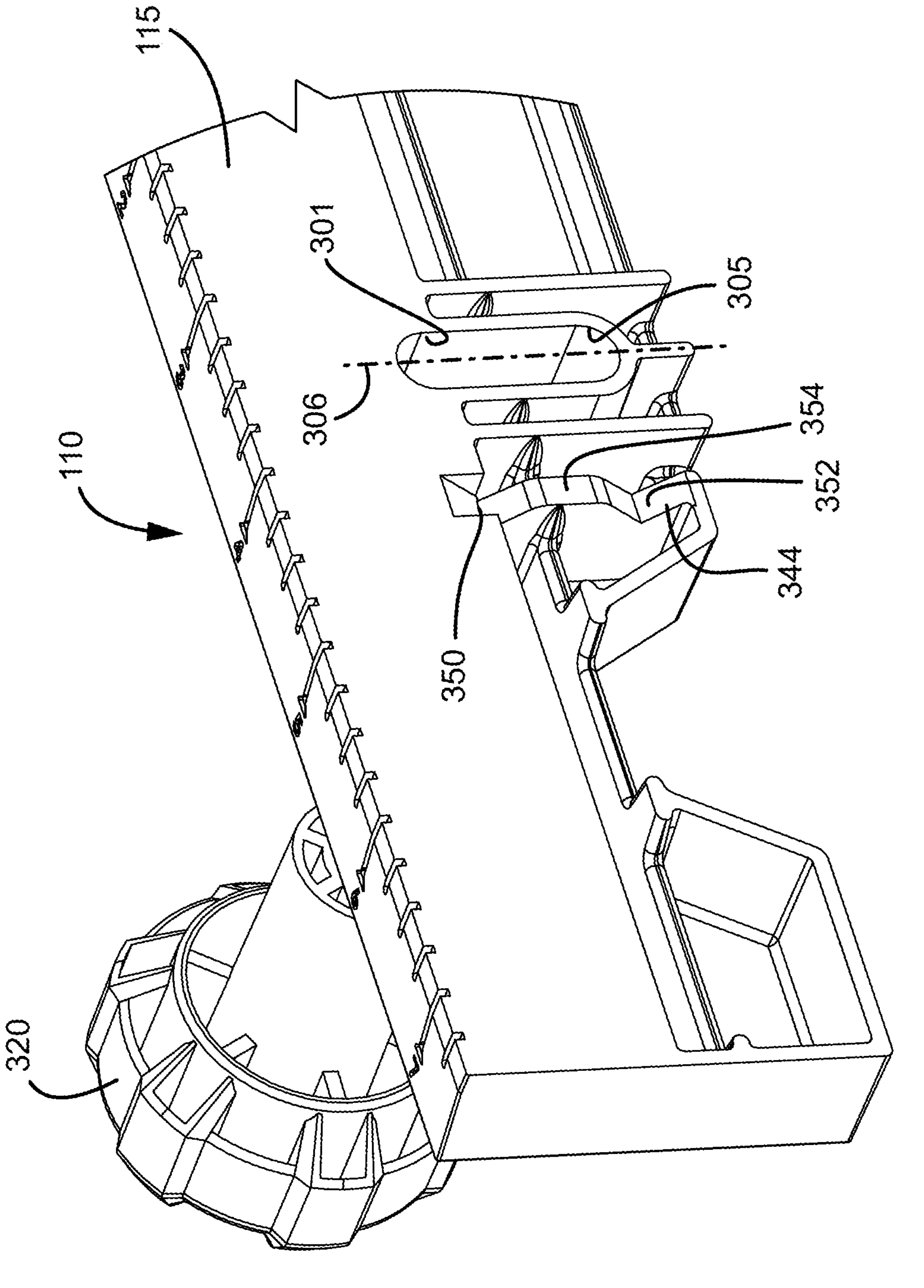
FIG. 23 is an enlarged, fragmented perspective view of a portion of the fence of the embodiment of FIGS. 20-22.

Attention is directed to FIG. 23, which shows an enlarged view of the detent arrangement 344. The detent arrangement 345 is structured the same as arrangement 344. The detent arrangement 344 includes an upper detent 350 and a lower detent 352 with a slide surface 354 therebetween. Spring 342 slides between the upper detent 350 and lower detent 352 to hold the fence 110 in the selected bypassed position (FIG. 21) and operating position (FIG. 20) while the turn knobs 320, 334 are retightened.

In use, when the user desires to move the rear fence 110 from the operating position to the bypass position, the user may rotate the knobs 320, 334 in a direction away from the rear fence 110. This allows the fence 110 to be moved vertically so that the slots 305, 330 move about the bolts 312, 332 from the operating position of FIG. 20 to the bypass position of FIG. 21. This also includes moving the fence 110 against the springs 342, 343 and between the lower detents 352 and upper detents 350. The knobs 320, 334 can then be rotated in a direction toward the rear fence 110 to tighten the knobs 320, 334 against the fence 110.

4. The Embodiment of FIGS. 24-28

Figure 24:
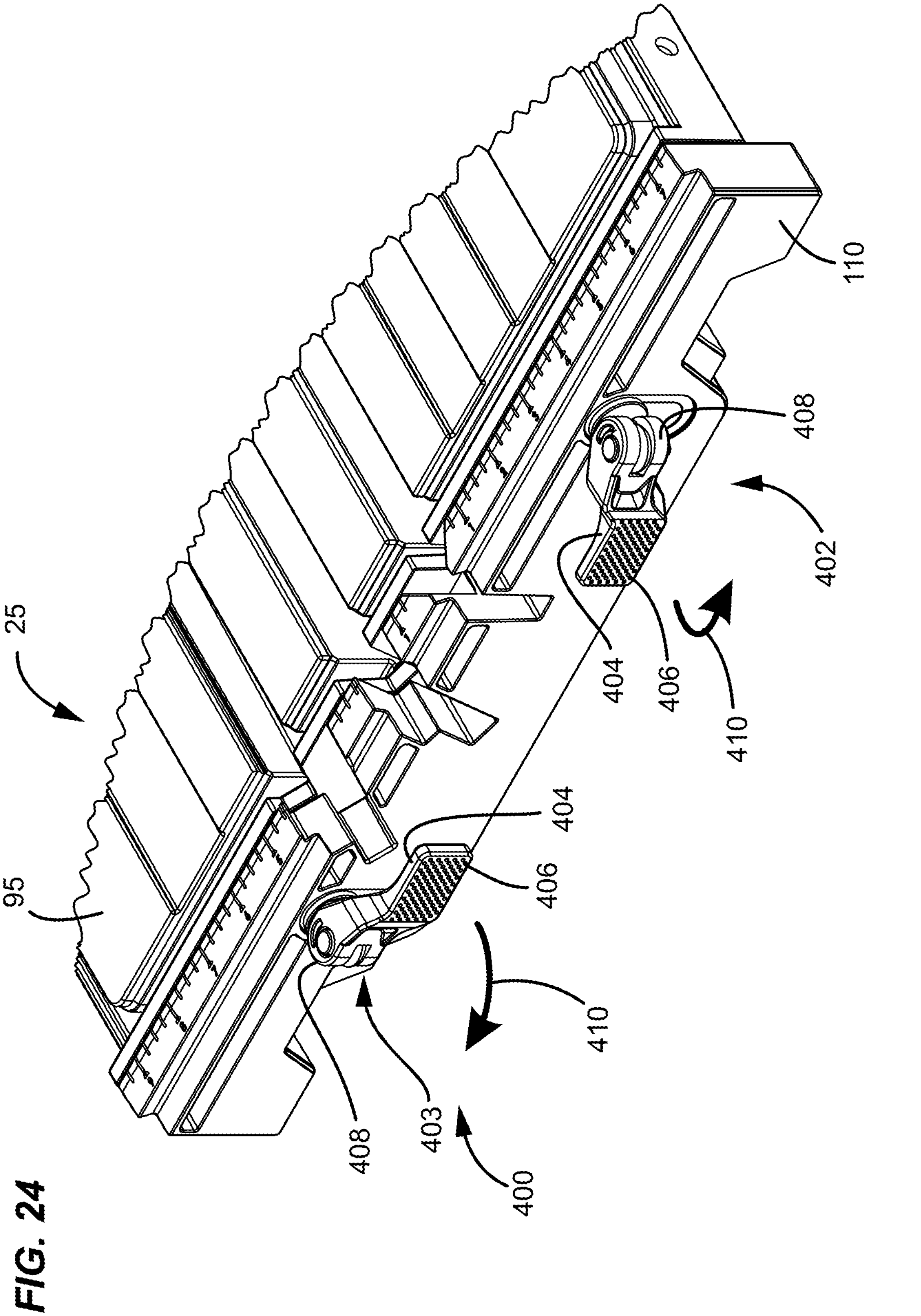
FIG. 24 is a perspective view of a fourth embodiment of a table and fence, with a portion of the table shown, and the fence being in the bypass position.
Figure 25:
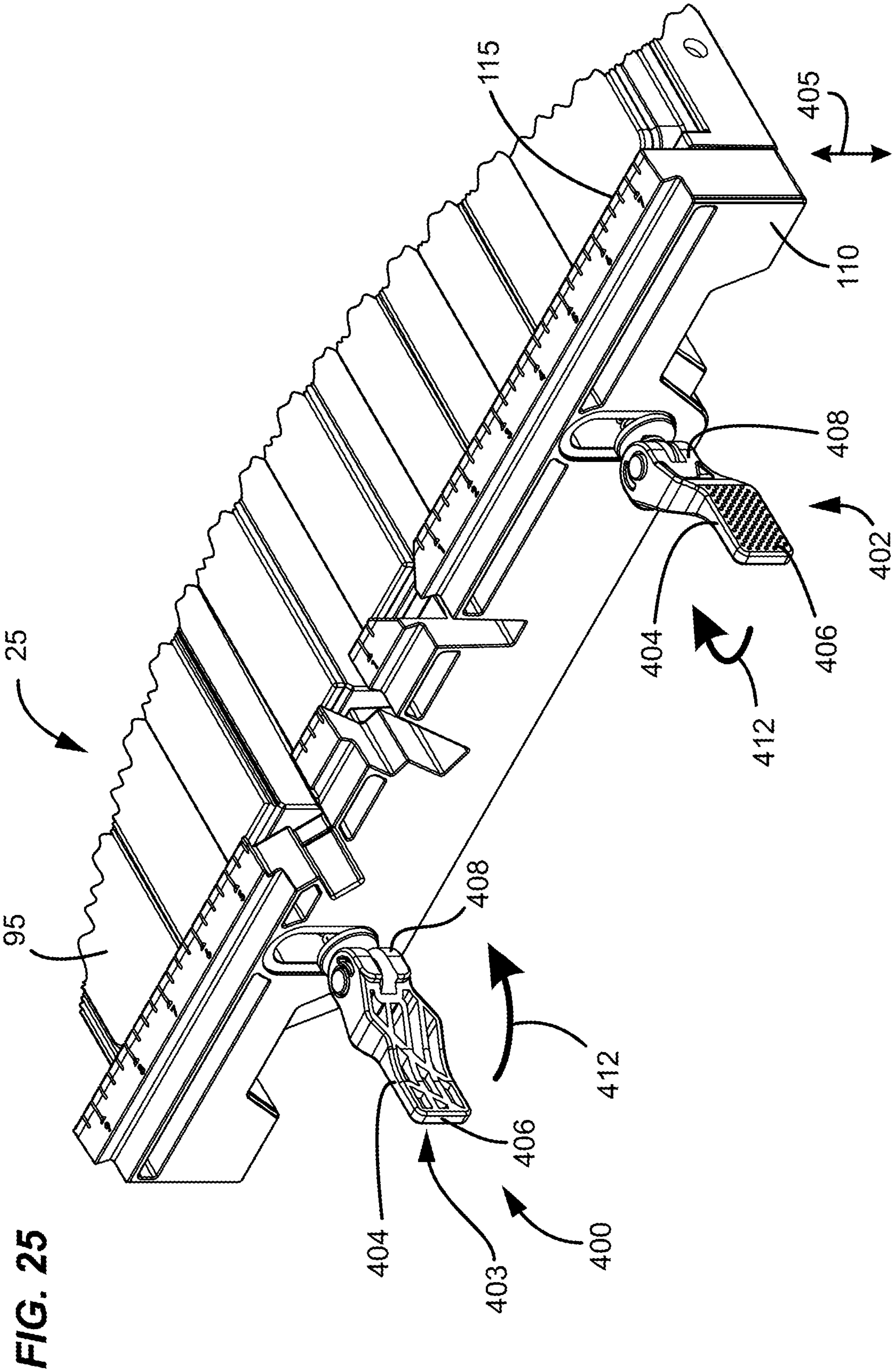
FIG. 25 is a perspective view of the table and fence of FIG. 24, but the fence being shown in the operating position.

Reference is now made to the embodiment of FIGS. 24-28. In this embodiment, the rear fence 110 is slidable between the operating position (FIG. 25) and the bypassed position (FIG. 24). In particular, the rear fence 110 is slidable in an axial direction relative to the table 25 between the operating position and bypassed position. By "axial direction," it meant that the fence 110 is slidable within a plane orthogonal to a plane containing the table 25. See arrow 405 in FIG. 25 showing the direction of motion of the fence 110.

The engagement surface 115 of the rear fence 110 remains perpendicular, or substantially perpendicular, to the planar top surface 95 of the table 25, when in both the operating position and the bypassed position. The engagement surface 115 is also within a plane that is perpendicular to the plane containing the cutting blade 15. In this embodiment, the engagement surface 115 is adjustable between the operating position and the bypass position by a clamp arrangement 400. The clamp arrangement 400 selectively holds the rear fence 110 in the selected position of either the operating position or the bypassed position.

Many embodiments are possible. In the embodiment shown, the clamp arrangement 400 includes a pair of cam lever clamps 402, 403. Each cam lever clamp 402, 403 includes a pivot lever 404 with a handle 406 a cam head 408. The handle 406 is sized to be gripped by a human hand and can be used to pivot the pivot lever 404 between a locked position and an unlocked position. In this embodiment, the locked position has the handle 406 adjacent and generally parallel to the fence 110 (FIG. 24), while the unlocked position has the handle 406 generally perpendicular to the fence 110 (FIG. 25).

FIG. 24 shows pivot arrows 410 indicating the direction of pivot from the locked position to the unlocked position, while FIG. 25 shows pivot arrows 412 indicating the direction of pivot from the unlocked position to the locked position. While FIG. 25 shows the fence 110 in the operating position and with the handles 406 in the unlocked position, it should be understood that after adjusting the fence 110 to the operating position, the pivot lever 404 would be pivoted into the locked position (handles 406 adjacent to the fence 110) to lock the fence 110 in the operating position.

Figure 26:
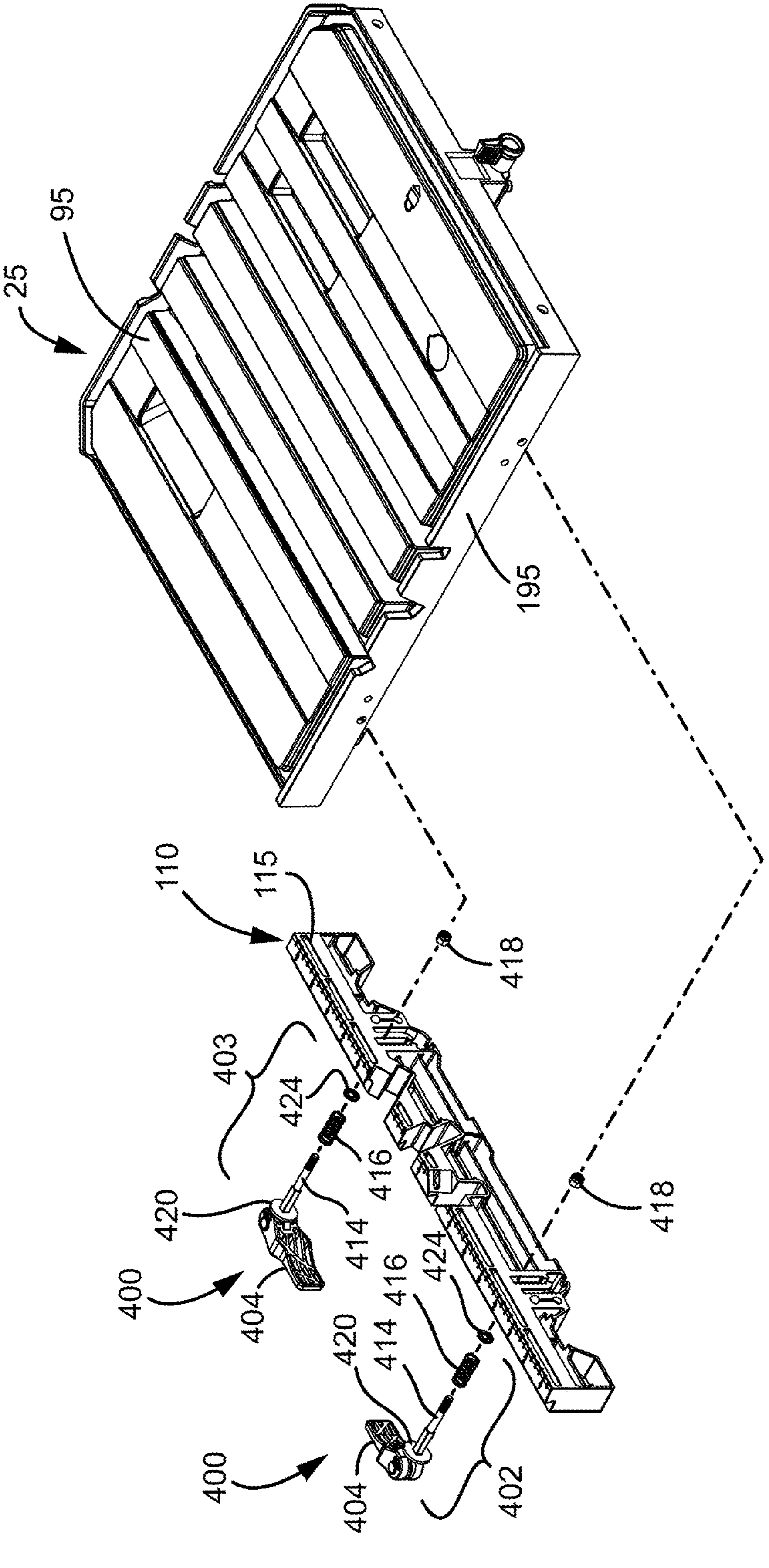
FIG. 26 is an exploded perspective view of the table and fence of FIGS. 24 and 25.
Figure 27:
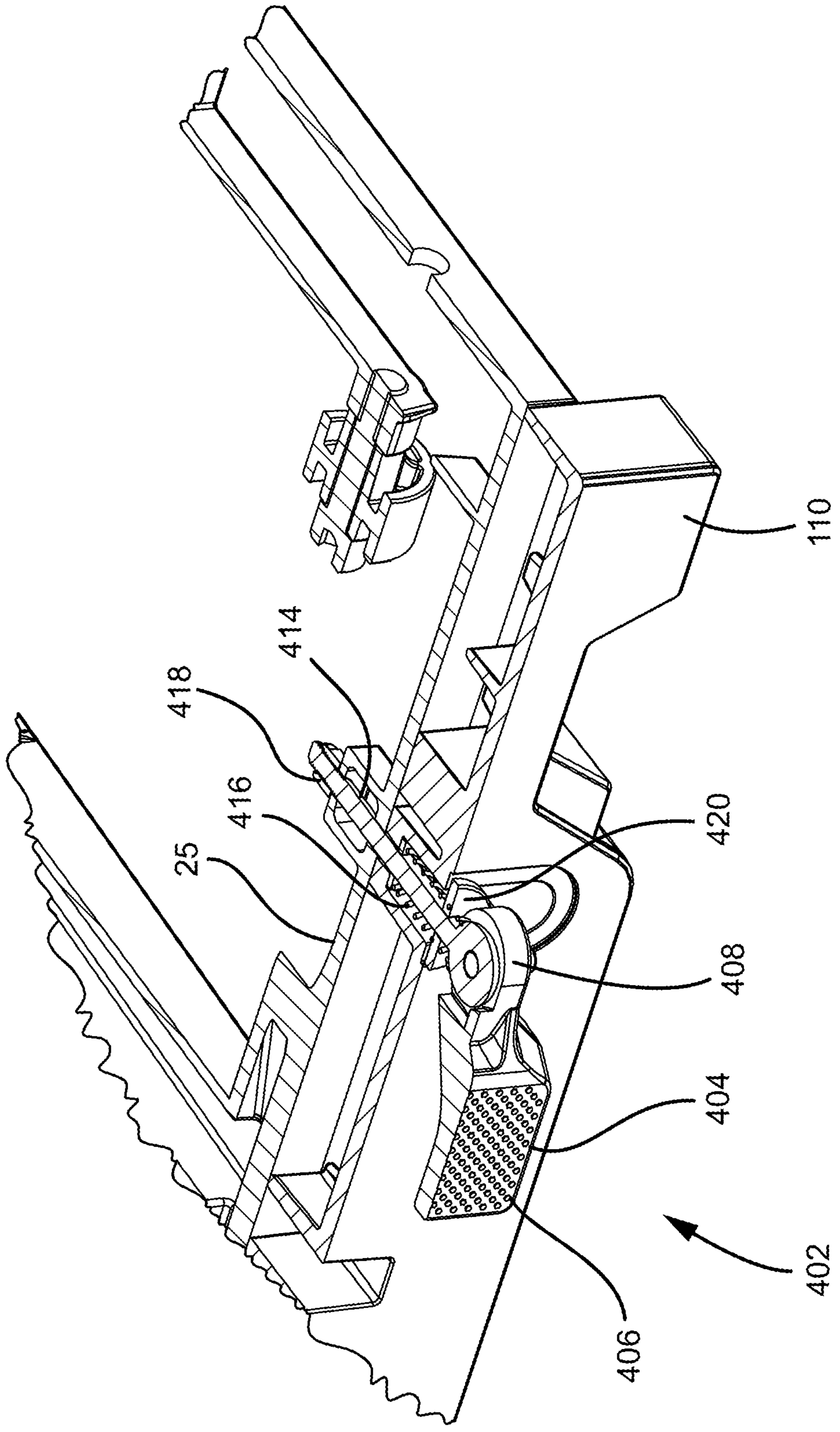
FIG. 27 is a cross-sectional, perspective view of a portion of the table and fence of FIGS. 24 and 25.
Figure 28:
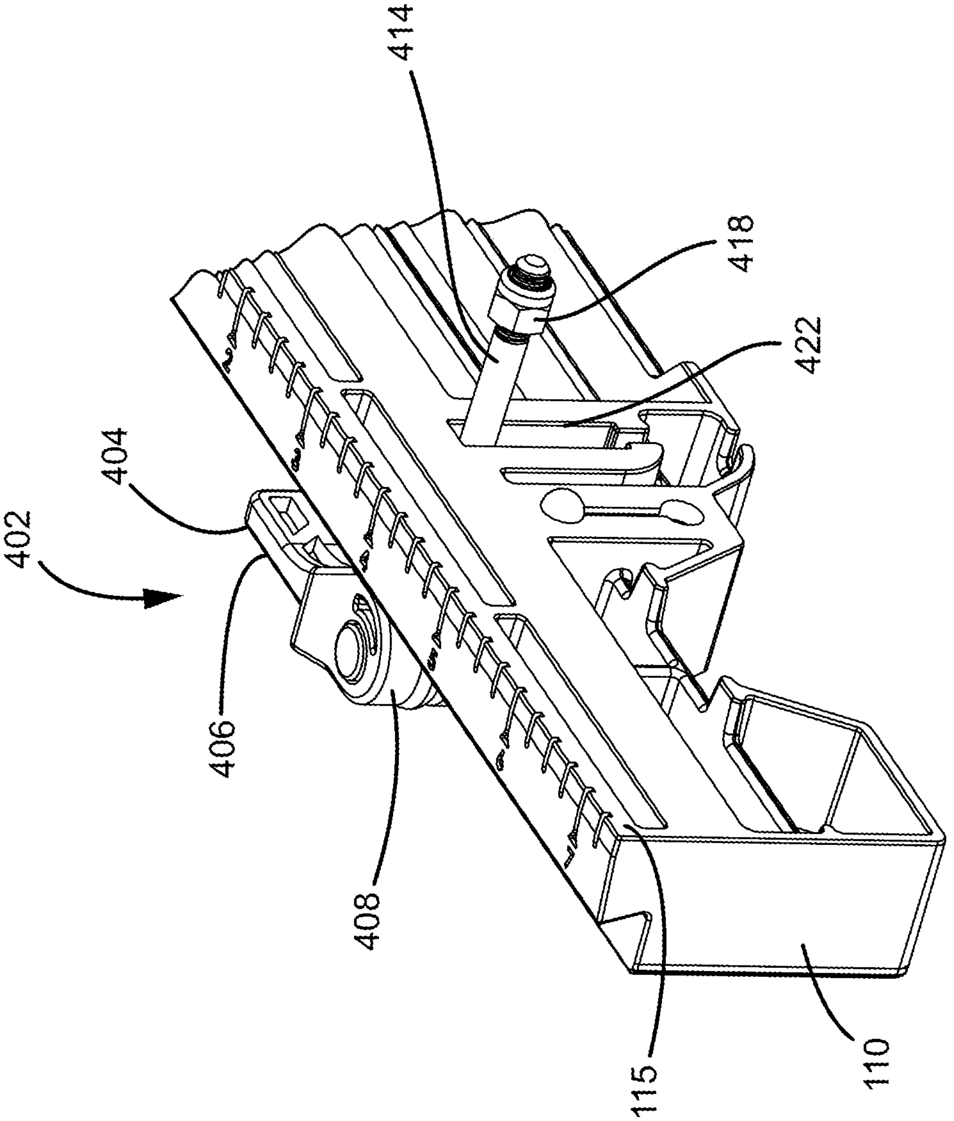
FIG. 28 is an enlarged, fragmented perspective view of a portion of the fence of the embodiment of FIGS. 24-26.

FIGS. 26-28 show further details of the example clamp arrangement 400. The pivot lever 404 is secured to a bolt 414 that is biased by a spring 416. The bolt 414 extends through the rear fence 110 and is movable along a vertically extending guide slot 422 (FIG. 28) in the rear fence 110. The bolt 414 extends into the rear face 195 of the table 25. A nut 418 is securable on an end of the bolt 414 to keep the bolt attached to the table 25. Also visible in FIGS. 26 and 27 is a washer 420 between the cam head 408 and the bolt 414, and a lock washer 424 against the fence 110. While only the cam lever clamp 402 is shown in FIGS. 27 and 28, it should be understood that the assembly for the cam lever clamp 403 is the same.

In use, when the user desires to move the rear fence 110 from the operating position to the bypass position, the user may pivot the pivot lever 404 by gripping the handles 406 and moving in the direction of arrows 410 from the locked position to the unlocked position. This motion rotates the cam head 408, which loosens the clamping force between the table 25 and the fence 110. Loosening of the clamping force allows the fence 110 to be moved vertically from the operating position of FIG. 25 to the bypass position of FIG. 24. This also includes moving the guide slots 422 in the fence 110 along the bolts 414. The pivot lever 404 can then be pivoted back into the locked position in the direction of arrows 412 to lock the fence 110 into the bypass position.

When the user desires to move the rear fence 110 from the bypass position to the operating position, the user pivots the pivot lever 404 in the direction of arrows 410 from the locked position to the unlocked position, which loosens the clamping force between the table 25 and the fence 110 and allows the fence 110 to be moved vertically from the bypass position of FIG. 24 to the operating position of FIG. 25. After adjusting the fence 110 to the operating position, the pivot lever 404 can then be pivoted back into the locked position in the direction of arrows 412 to lock the fence 110 into the operating position.

5. Methods

The tile saw 110 can be used in a method of adjusting the tile saw 110 to accommodate a long length of tile. The method includes providing saw 20 having cutting blade 15. The frame 30 supports the saw 20. Table 25 has planar surface 95 configured to the support the workpiece 135, which can be tile. Rear fence 110 is secured to the table 25. The method includes the step of adjusting the rear fence 110 from the operating position to the bypassed position by moving the engagement surface 115 to a position no higher than even with the planar surface 95 of the table 25 to allow the workpiece 135, such as tile, to extend beyond the rear edge 125 of the table 25.

The step of adjusting the rear fence 110 may include pivoting the rear fence 110 between the operating position and bypass position.

The step of adjusting the rear fence 110 can include using latch 165 to release the rear fence 110 from the operating position and then pivoting the rear fence 110 to the bypassed position.

The step of adjusting the rear fence 110 can include sliding the rear fence 110 between the operating position and bypass position. This may include the step of loosening a knob 220 to release the rear fence 110 from the operating position and then sliding the rear fence 110 to the bypassed position.

The step of loosening a knob 220 can include loosening first and second knobs 320, 334 to release the rear fence 110 from the operating position, and then sliding the rear fence 110 to the bypassed position.

The step of sliding the rear fence 110 between the operating position and bypassed position may also include moving the fence 110 against a spring 342 between a pair of detents 352, 350.

The step of sliding the rear fence 110 between the operating position and bypassed position can include moving the fence 110 against a pair of springs 342, 343, each spring 342, 343 moving between a respective pair of detents 352, 350.

The step of adjusting the rear fence 110 can include pivoting a pivot lever 404 of a cam lever clamp 402, 403 to loosen a clamping force between the rear fence 110 and the table 25 and then sliding the rear fence 110 to the bypassed position.

The above represents example principles. Many embodiments can be made using these principles.

What is claimed is:

1. A tile saw comprising:
(a) a saw having a cutting blade;
(b) a frame supporting the saw;
(c) a table having a planar surface configured to support a workpiece, the table being slidable relative to the frame; and
(d) a rear fence secured to the table, the rear fence having an engagement surface that is adjustable between an operating position and a bypassed position, wherein:
when in the operating position, the engagement surface of the rear fence projects upwardly from the planar surface of the table to support the workpiece during a cutting operation; and
(ii) when in the bypassed position, the engagement surface of the rear fence is no higher than even with the planar surface of the table to allow the workpiece to extend beyond a rear edge of the table, wherein the rear fence is slidable between the operating position and the bypassed position, and wherein the engagement surface of the rear fence, when in both the operating position and the bypassed position, is perpendicular to the planar surface of the table.

2. The tile saw of claim 1 wherein the engagement surface, when in the operating position, is disposed along a plane that is perpendicular to a plane containing the cutting blade.

3. The tile saw of claim 2 wherein a latch arrangement selectively holds the rear fence in the operating position and releases the rear fence to the bypassed position.

4. The tile saw of claim 1 wherein a pin and guideway arrangement selectively holds the rear fence in the operating position and releases the rear fence to the bypassed position.

5. The tile saw of claim 4 wherein the pin and guideway arrangement includes a guideway defined within the rear fence and a knobbed pin adjustable within the guideway to selectively fix the rear fence in one of the operating position and the bypassed position.

6. The tile saw of claim 1 further comprising a spring and detent arrangement for holding the rear fence in the selected operating position or the bypassed position, the spring and detent arrangement including:
at least one spring secured to one of the rear fence and a rear face of the table; and
at least one detent arrangement positioned to engage the at least one spring defined by the other of the rear fence and the rear face of the table.

7. The tile saw of claim 1 wherein a clamp arrangement selectively holds the rear fence in one of the operating position and the bypassed position.

8. The tile saw of claim 7 wherein the clamp arrangement comprises a cam lever clamp having a pivot lever secured to a spring-biased bolt, the bolt extending through the rear fence and into a rear face of the table.

9. The tile saw of claim 1 further comprising a rip guide secured to the table having a rip guide engagement surface in a plane parallel to a plane containing the cutting blade.

10. The tile saw of claim 1 further comprising a water tray on a side of the saw opposite of the table.

11. A method of adjusting a tile saw to accommodate a length of tile, the method comprising:

(a) providing a saw comprising:

a cutting blade;

a frame supporting the saw;

a table having a planar surface configured to support the tile, the table being slidable relative to the frame; and a rear fence secured to the table; and (b) adjusting the rear fence from an operating position to a bypassed position by moving an engagement surface of the rear fence to a position substantially even with the planar surface of the table to allow the tile to extend beyond a rear edge of the table, wherein the rear fence slides between the operating position and the bypassed position, and wherein the engagement surface of the rear fence, when in both the operating position and the bypassed position, is perpendicular to the planar surface of the table.

12. The method of claim 11 wherein the step of adjusting includes one of:

(i) loosening a knob to release the rear fence from the operating position and then sliding the rear fence to the bypassed position; or (ii) pivoting a cam lever to loosen a clamping force between the rear fence and the table and then sliding the rear fence to the bypassed position.

13. A tile saw comprising:

(a) a saw having a cutting blade;

(b) a frame supporting the saw;

(c) a table having a planar surface configured to support a workpiece, the table being slidable relative to the frame;

(d) a rear fence secured to the table, the rear fence having an engagement surface that is adjustable between an operating position and a bypassed position, wherein:

(i) when in the operating position, the engagement surface of the rear fence projects upwardly from the planar surface of the table to support the workpiece during a cutting operation; and (ii) when in the bypassed position, the engagement surface of the rear fence is no higher than even with the planar surface of the table to allow the workpiece to extend beyond a rear edge of the table; and (e) a clamp arrangement selectively holds the rear fence in one of the operating position and the bypassed position, wherein the clamp arrangement comprises a cam lever clamp having a pivot lever secured to a spring-biased bolt, the bolt extending through the rear fence and into a rear face of the table.

14. The tile saw of claim 13 further comprising a rip guide secured to the table having a rip guide engagement surface in a plane parallel to a plane containing the cutting blade.

15. The tile saw of claim 13 further comprising a water tray on a side of the saw opposite of the table.

* * * * *